US010766523B2

(12) United States Patent
Itou et al.

(10) Patent No.: US 10,766,523 B2
(45) Date of Patent: Sep. 8, 2020

(54) STEERING DEVICE

(71) Applicant: Hitachi Automotive Systems, Ltd., Hitachinaka-shi, Ibaraki (JP)

(72) Inventors: Takahiro Itou, Tokyo (JP); Masaru Yamasaki, Tokyo (JP); Mitsuo Sasaki, Hitachinaka (JP); Kazuya Yamano, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/069,048

(22) PCT Filed: Jan. 5, 2017

(86) PCT No.: PCT/JP2017/000084
§ 371 (c)(1),
(2) Date: Jul. 10, 2018

(87) PCT Pub. No.: WO2017/122562
PCT Pub. Date: Jul. 20, 2017

(65) Prior Publication Data
US 2019/0016378 A1    Jan. 17, 2019

(30) Foreign Application Priority Data

Jan. 13, 2016   (JP) ................ 2016-004057

(51) Int. Cl.
*B62D 5/04* (2006.01)
*H02P 6/04* (2016.01)
(Continued)

(52) U.S. Cl.
CPC ......... *B62D 5/0484* (2013.01); *B62D 5/0463* (2013.01); *B62D 6/002* (2013.01);
(Continued)

(58) Field of Classification Search
USPC ........................................ 701/43
See application file for complete search history.

(56) References Cited

U.S. PATENT DOCUMENTS 5,506,776 A * 4/1996 Fushimi ................ B62D 7/148
180/413
8,473,144 B1 * 6/2013 Dolgov .............. G01C 21/3407
701/28
(Continued)

FOREIGN PATENT DOCUMENTS

CN   102026862 A  *  5/2008
JP   H04-055168 A     2/1992
(Continued)

OTHER PUBLICATIONS

Google Translation of German Patent Pub. No. DE 102012213709A1 to Tons et al. (hereinafter "Tons").*
(Continued)

*Primary Examiner* — Jean Paul Cass
(74) *Attorney, Agent, or Firm* — Foley & Lardner LLP

(57) ABSTRACT

Provided is a steering device which allows continued safe travel in the event of a fault during automatic steering control. The steering device is equipped with an electric drive device composed of a plurality of systems of electric motors and has an assist control function for assisting a driver in steering and an automatic steering control function for automatically controlling the steering angle of steered wheels on the basis of a steering angle instruction value. In the event a fault occurs in one of the electric motor systems of the electric drive device during control under automatic operation control, a controller in the steering device maintains automatic operation control S36 using the electric motor of a normally operating system not suffering from a fault, and then, upon shifting to assist control S21, the controller sets the output limit value of the electric motor to
(Continued)

a fault-time output limit value, which is less than a normal-time output limit value set when all electric motor systems are operating normally.

17 Claims, 15 Drawing Sheets

(51) Int. Cl.
    *H02P 5/46*       (2006.01)
    *B62D 6/00*       (2006.01)
    *H02P 29/024*     (2016.01)
    *H02P 6/12*       (2006.01)

(52) U.S. Cl.
    CPC ............... *H02P 5/46* (2013.01); *H02P 6/04* (2013.01); *H02P 6/12* (2013.01); *H02P 29/0241* (2016.02); *H02P 2006/045* (2013.01)

(56) References Cited

U.S. PATENT DOCUMENTS

| | | | |
|---|---|---|---|
| 2005/0092105 A1* | 5/2005 | Feick | H02P 29/02 73/862.08 |
| 2007/0198145 A1* | 8/2007 | Norris | G05D 1/021 701/23 |
| 2008/0051959 A1* | 2/2008 | Ishihara | B62D 5/046 701/41 |
| 2011/0315469 A1 | 12/2011 | Uryu | |
| 2011/0315470 A1 | 12/2011 | Uryu | |
| 2013/0002416 A1* | 1/2013 | Gazit | B62D 15/0255 340/438 |
| 2013/0131906 A1* | 5/2013 | Green | G08G 1/00 701/23 |
| 2013/0173118 A1 | 7/2013 | Suzuki | |
| 2013/0179039 A1 | 7/2013 | Uryu | |
| 2013/0226408 A1* | 8/2013 | Fung | A61B 5/18 701/41 |
| 2013/0317699 A1* | 11/2013 | Urhahne | B62D 15/025 701/41 |
| 2014/0156134 A1* | 6/2014 | Cullinane | G05D 1/0212 701/23 |
| 2015/0341840 A1* | 11/2015 | Lee | H04W 36/14 455/437 |
| 2016/0001781 A1* | 1/2016 | Fung | G16H 50/20 701/36 |
| 2016/0176400 A1 | 6/2016 | Nakano et al. | |
| 2016/0232788 A1* | 8/2016 | Byun | H04W 4/40 |
| 2017/0115661 A1 | 4/2017 | Pink et al. | |
| 2018/0009470 A1* | 1/2018 | Meyer | B60W 10/04 |

FOREIGN PATENT DOCUMENTS

| | | |
|---|---|---|
| JP | 2006-224750 A | 8/2006 |
| JP | 2008-001286 A | 1/2008 |
| JP | 2012-025372 A | 2/2012 |
| JP | 2012-025374 A | 2/2012 |
| JP | 2012-056404 A | 3/2012 |
| JP | 2013-141869 A | 7/2013 |
| JP | 2014-019301 A | 2/2014 |
| JP | 2015-020719 A | 2/2015 |
| JP | 2015-085887 A | 5/2015 |
| JP | 2015-171851 A | 10/2015 |
| JP | 2015-209160 A | 11/2015 |
| JP | 2016-113024 A | 6/2016 |
| WO | WO-2015/197251 A1 | 12/2015 |

OTHER PUBLICATIONS

Google Translation of Chinese Patent Application Pub. No. CN102490780A that published in 2012.*
Google Translation of Korean Patent Pub. No. KR 101688762B (Aug. 19, 2019).*
Office Action issued in corresponding Japanese Application No. 2017-561591 dated May 14, 2019 with English machine translation.
International Search Report with English translation and Written Opinion issued in corresponding application No. PCT/JP2017/000084 dated Mar. 21, 2017.

* cited by examiner

STEERING DEVICE

TECHNICAL FIELD

The present invention relates to a steering device having a plurality of drive devices and an electric drive device composed of a plurality of electric motor windings.

BACKGROUND ART

A control device of a steering device such as a power steering device serves to selectively control two controls: an assist control which controls an actuator including a motor or the like based on a driving state of a vehicle to provide a steering assist force for assisting a steering force of a driver and an automatic steering control which generates a target steering angle based on an instruction value of a host controller and controls the actuator to automatically adjust a steering angle of a steered wheel (for example, refer to JP H4-55168 A: PTL 1).

Further, to minimize a state in which the steering assist function of the steering device is lost during running, a steering device including two systems configuring an electric motor drive device which are composed of a combination of a drive device including an inverter or the like and a pair of electric motor windings corresponding to the drive device are used (for example, refer to JP 2012-25374 A: PTL 2). In this steering device, when a fault of the inverter or the winding set of any of the two systems is detected, a power supply relay of the fault system is shut off, and an upper limit value (maximum current limit value) of a current supply limit value of the normal system is set to be the same value as before the fault detection. Further, when a vehicle speed is less than a predetermined threshold value, the maximum current limit value is set to be zero to prevent a steering assist torque from being generated.

CITATION LIST

Patent Literature

PTL 1: JP H4-55168 A
PTL 2: JP 2012-25374 A

SUMMARY OF INVENTION

Technical Problem

In the steering device disclosed in PTL 2, the maximum current limit value is set to be zero when the vehicle speed is lower than the predetermined speed after the fault detection to prevent the assist torque from being generated, so that a driver can notice the fault and the heat generation of the electric motor can be suppressed. Here, there may be considered a case in which the steering device including the electric motor drive device composed of multiple systems as disclosed in PTL 2 is used in a system which has a control system including the two controls, that is, the assist control and the automatic steering control as disclosed in PTL 1.

At this time, if a fault occurs in the electric motor of one system during the automatic steering and a driver takes his/her hand off the steering wheel, there is a possibility that the torque is not be generated and a running behavior of the vehicle will be disturbed until the driver holds the steering wheel. In addition, when the driver notices the fault and keeps running the vehicle with holding the steering wheel, the shifting to the assist control is performed. However, if the torque equivalent to that before the fault is output after the shifting to the assist control, the torque assisted by the electric motor will be directly transmitted to the driver in the case in which a fault also occurs in other normal systems. In this case, the driver feels a torque shock. In addition, the steering wheel moves by a reaction force from a road surface, thus the vehicle behavior is disturbed.

An object of the present invention is to provide a steering device capable of safely and continuously running a vehicle when a fault occurs during an automatic steering control.

Solution to Problem

To achieve the above-described object, a steering device of the present invention, includes:

an electric drive device which includes a plurality of systems having electric motors composed of a combination of driving circuits and winding sets; and a controller which selects any of an assist control for assisting a steering force based on a steering torque input by an operation of a steering wheel and an automatic steering control for controlling a steering angle of a steered wheel based on a steering instruction value and controls an output of the electric drive device to be in a range not exceeding a preset output limit value, wherein when a fault occurs in one system having the electric motor of the electric drive device during the control by the automatic steering control, the controller continues to perform the automatic steering control using an electric motor of a normal system with no fault, and then sets the output limit value of the electric motor of the normal system upon shifting to the assist control as an output limit value upon fault lower than an output limit value upon a normal operation which is set when electric motors of all the systems are normally operated.

Advantageous Effects of Invention

According to the present invention, the steering device including the electric drive device composed of the plurality of electric motors continues to perform the automatic operation control using the electric motor of the normal system until the driver holds and operates the steering wheel, when a fault occurs in the electric motor of one system under the condition that the driver takes his/her hand off the steering wheel during the automatic steering control. Thereafter, if the driver notices the fault and steers the steering wheel, the shifting to the assist control is performed. Furthermore, the output limit value in the case of the shifting to the assist control after the fault is set to be lower than the output limit value in the case where all the electric motors are in the normal state. By doing so, it is possible to reduce the assisting force, and reduce the torque shock transmitted to the driver due to the loss of the assist, for example, even if a fault also occurs in other normal electric motors. Therefore, according to the present invention, it is possible to stably and continuously run the vehicle without greatly disturbing the vehicle behavior even if a fault occurs in the steering device during the automatic operation.

Other objects, structures and effects other than the above are clarified from the description of the following embodiments.

DESCRIPTION OF EMBODIMENTS

Hereinafter, embodiments according to the present invention will be described. It should be noted that configurations described with reference to FIGS. 1 and 2 are common to each of the embodiments described below.

Figure 1:
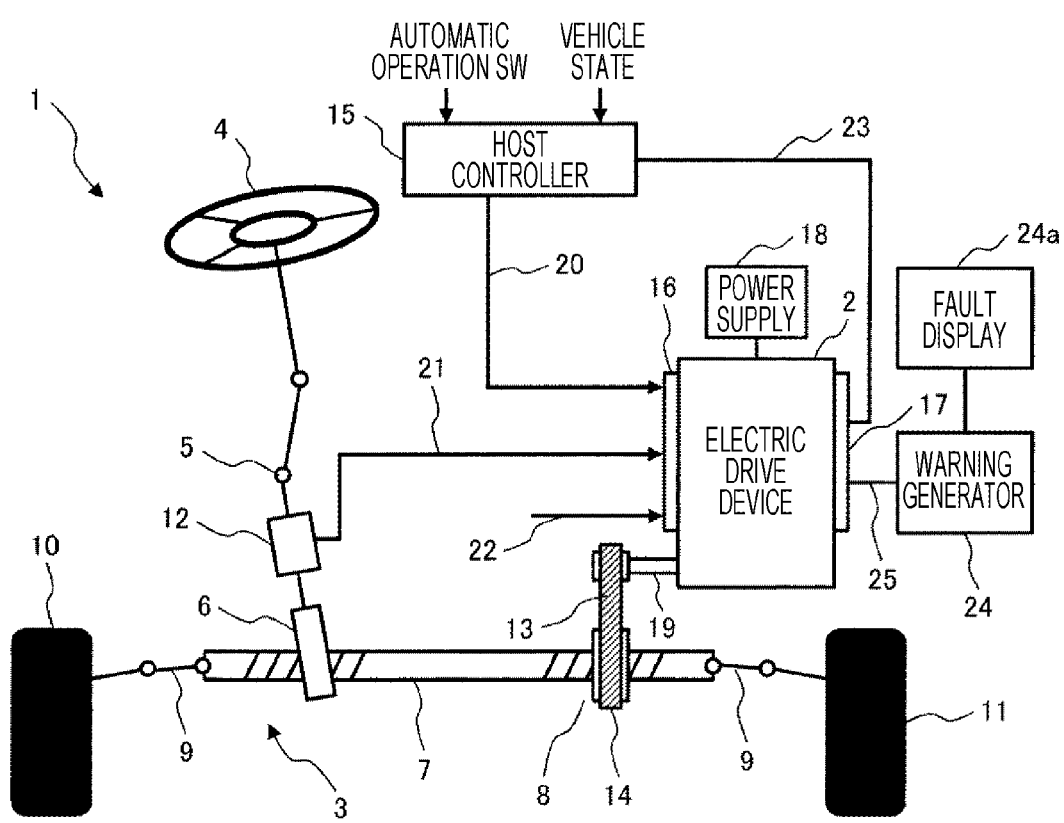
FIG. 1 is a schematic diagram showing a configuration of a steering device according to an embodiment of the present invention.
Figure 2:
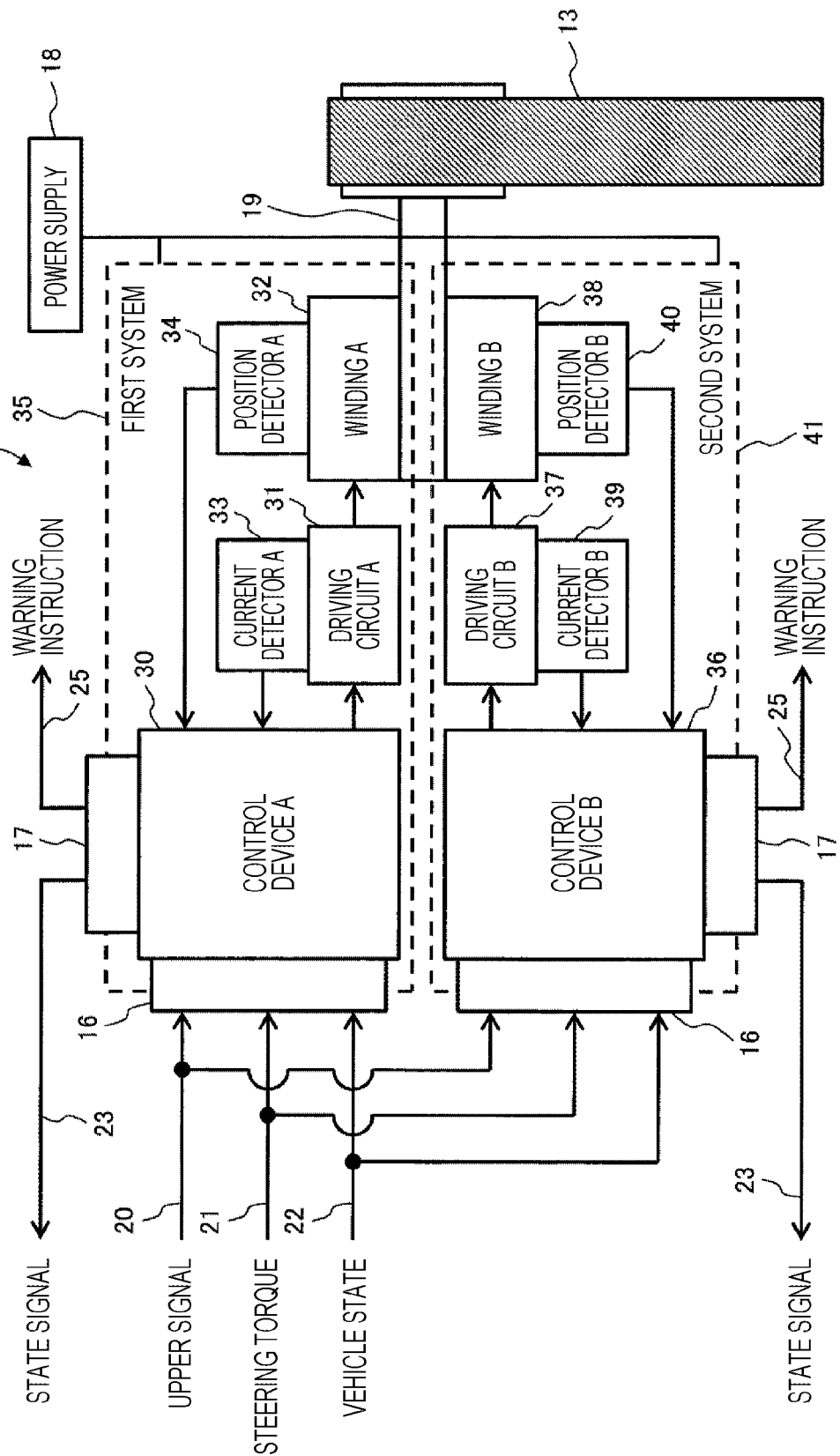
FIG. 2 is a schematic diagram showing a configuration of an electric drive device of the steering device according to the embodiment of the present invention.

FIG. 1 is a schematic diagram showing a configuration of a steering device according to an embodiment of the present invention.

A steering device 1 is composed of an electric drive device 2 and a steering mechanism 3.

The steering mechanism 3 includes a steering wheel 4, a steering shaft 5, a pinion shaft 6, and a rack shaft 7. The electric drive device 2 is connected to the rack shaft 7 via a deceleration mechanism 8.

The rack shaft 7 is provided with rack teeth which mesh with the pinion shaft 6, which configures a rack and pinion mechanism and converts a rotation of the pinion shaft 6 into a linear motion of the rack shaft 7. That is, if a driver operates the steering wheel 4, the rotation is transmitted to the pinion shaft 6 via the steering shaft 5. The rotational motion of the pinion shaft 6 is converted into linear motion of the rack shaft 7. Thereby, left and right wheels 10 and 11, which are connected to each other via a tie rod 9 connected to both ends of the rack shaft 7, are steered.

A torque sensor 12 is provided between the steering shaft 5 and the pinion shaft 6. The torque sensor 12 outputs a steering torque 21 based on a torsion angle of a torsion bar (not shown). The torsion bar is disposed at a connection part between the steering shaft 5 and the pinion shaft 6.

As the deceleration mechanism 8 connected to an output shaft 19 of the electric drive device 2, for example, in FIG. 1, a ball screw 14 driven by a belt/pulley 13 attached to the output shaft of the electric drive device 2 is used. With this configuration, a torque of a motor 9 is converted into a translation direction force of the rack shaft 7. It should be noted that as the deceleration mechanism 8, a configuration using the rack and pinion similarly to an input of the steering wheel 4, a configuration using a ball screw nut directly driven by a hollow motor or the like may be used.

A host controller 15 receives a signal from an automatic operation switch (SW) operated when a driver selects a control by automatic steering, vehicle state signals obtained from a camera, a sensor, map information and the like which are equipped in the vehicle, or the like. If a driver operates an automatic steering switch to select a vehicle control in an automatic operation, a route of a vehicle is generated based on the vehicle state signal, and in order to realize this, a signal indicating which of an automatic steering control and an assist control is to be executed or an upper signal 20 including a steering angle instruction value or the like which is required for the steering device 1 upon the automatic steering control is output to the electric drive device 2 of the steering device 1.

The electric drive device 2 includes an input terminal 16 and an output terminal 17 and is connected to a power supply 18. Vehicle state signals 22 such as an upper signal 20, a steering torque value 21 and a vehicle speed are input to the input terminal 16 of the electric drive device 2. In addition, a motor control current 24 calculated by control devices 30 and 36 (see FIG. 2), a signal 23 transmitting an operation state of the steering device 1 to the host controller 15, and a warning instruction 25 to a warning device (warning generator) 24 providing notification of states such as a fault, and the like are output from the output terminal 17 of the electric drive device 2.

FIG. 2 is a schematic diagram showing a configuration of the electric drive device of the steering device according to the embodiment of the present invention.

As shown in FIG. 2, the electric drive device 2 is composed of a first system electric motor (first system electric driver) 35 and a second system electric motor (second system electric driver) 41. The first system electric motor 35 includes a control device A30, a driving circuit A31, a winding A32, a current detector A33, and a position detector A34. The second system electric motor 41 has the same configuration as that of the first system electric motor 35, and includes a control device B36, a driving circuit B37, a winding B38, a current detector B39, and a position detector B40. Here, the driving circuit A31 and the winding A32, and the driving circuit B37 and the winding B38 each configure, for example, a set (system) of windings of an inverter and a brushless motor, and a current flows in the winding A32 and the winding B38 by operating the driving circuit A31 and the driving circuit B37 to generate a torque which rotates a rotor connected to the driving shaft 19.

Next, the components of the respective systems 35 and 41 will be described in detail. Since the first system electric motor 35 and the second system electric motor 41 have the same configuration, the first system electric motor 35 will be described, and the components of the second system electric motor 41 corresponding to the components of the first system electric motor 35 will be described with reference numerals with parentheses. In addition, "A" and "B" are symbols for distinguishing between the first system electric motor 35 and the second system electric motor 41, but this symbol will be used together with the sign for the sake of clarity.

The current detector A33 (B39) measures a current supplied to the winding A32 (B38). The current detected by the current detector A33 (B39) is fed back to the control device A30 (B36).

The position detector A34 (B40) detects a position of the output shaft 19 which is driven by the torque generated by the current supplied to the winding A32 (B38). The position of the output shaft 19 detected by the position detector A34 (B40) is fed back to the control device A30 (B36).

Further, the control device A30 (B36) has a function of executing various controls such as the automatic steering control for performing the automatic steering and the assist control for assisting the steering torque 21 of the driver. Further, the control device A30 (B36) has a function of calculating the upper signal 20 or the steering torque 21 signal from the host controller and a torque instruction value from the vehicle state 22 or the like. Further, the control device A30 (B36) has a function of calculating a current instruction value supplied to the winding A32 (B38) so that the electric drive device 2 generates the same torque as the torque instruction value based on the torque instruction value, the current feedback value of the current detector A33 (B39), and the position feedback value of the position detector A34 (B40). In addition, the control device A30 (B36) operates the driving circuit A31 (B37) so that the current equivalent to the current instruction value is supplied to the winding A32 (B38). By doing so, the winding A32 and the winding B38 are connected to the same output shaft 19, such that the sum of torques generated in each of the winding A32 and the winding B38 is output from the output shaft 19.

Hereinafter, embodiments of the electric drive device 2 of the steering device 1 according to the present invention will be described with reference to the accompanying drawings. It should be noted that in each drawing, like elements are denoted by like reference numerals, and redundant description thereof will be omitted.

First Embodiment

Figure 3:
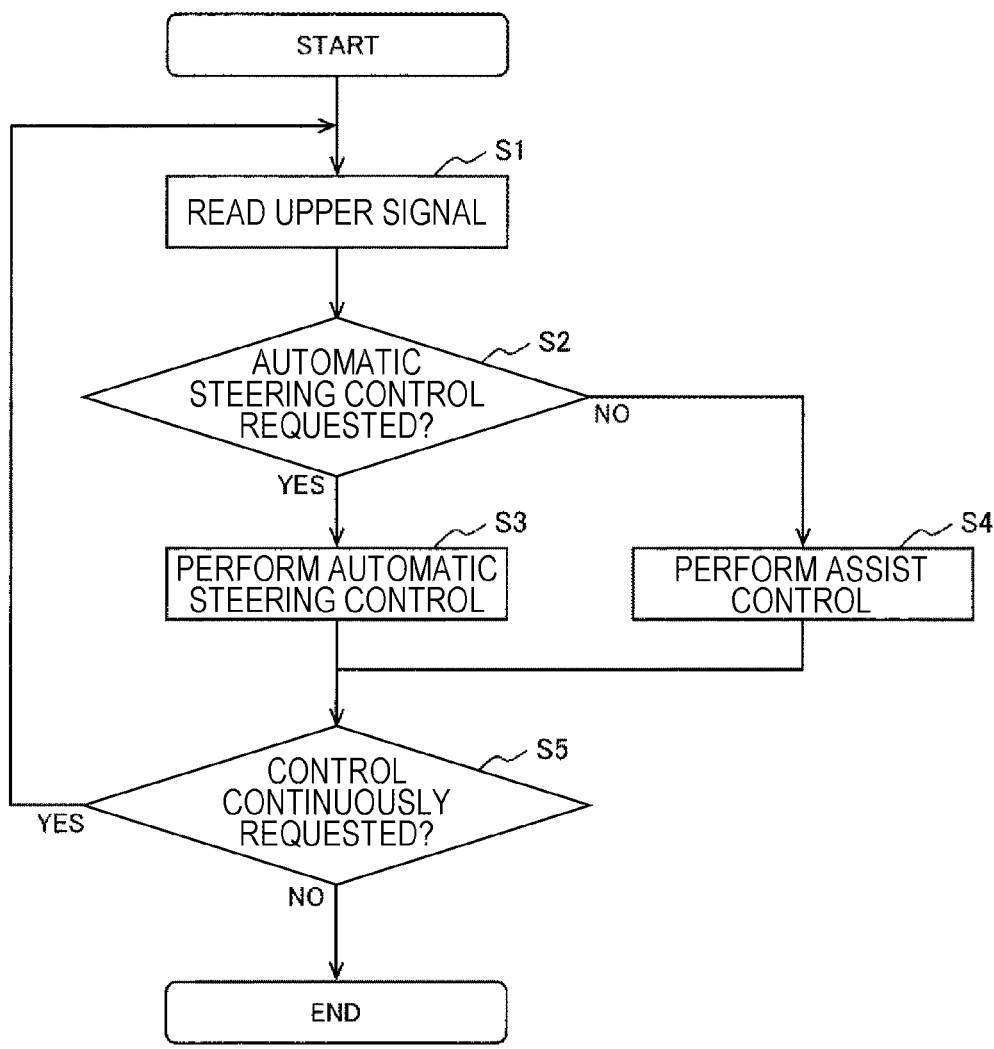
FIG. 3 is a flowchart showing a control upon a normal operation of a steering device according to a first embodiment of the present invention.

FIG. 3 is a flowchart schematically showing the control of the electric drive device 2 when the steering device 1 is operating normally (upon normal operation).

The electric drive device 2 selects a control method based on the upper signal 20 output from the host controller 15.

First, the control device A30 and the control device B36 read the upper signal 20 from the host controller 15 (step S1). Next, it is determined whether or not there is a request for the automatic steering control in step S2. Here, the request for the automatic steering control is issued, for example, when the driver controls the automatic operation switch to select the automatic operation control and the vehicle state satisfies the conditions (during the safe running, no fault, and the like) required to start the automatic operation. The control method proceeds to step S3 when the execution of the automatic operation control is requested by the host controller 15 to execute the automatic steering control (step S3). In addition, in step S2, the control method proceeds to step S4 if it is determined that there is the assist control request (normal control state) to execute the assist control. After the execution of step S3 or step S4, the control method proceeds to step S5 and returns to the step S1 when the control is continuously requested such as when the vehicle is in a starting state, and the flow of FIG. 3 is repeated. On the other hand, ending processing is performed when the control is not continuously requested such as when the function of the vehicle is in a stopped state, and thus the system is stopped.

Figure 4:
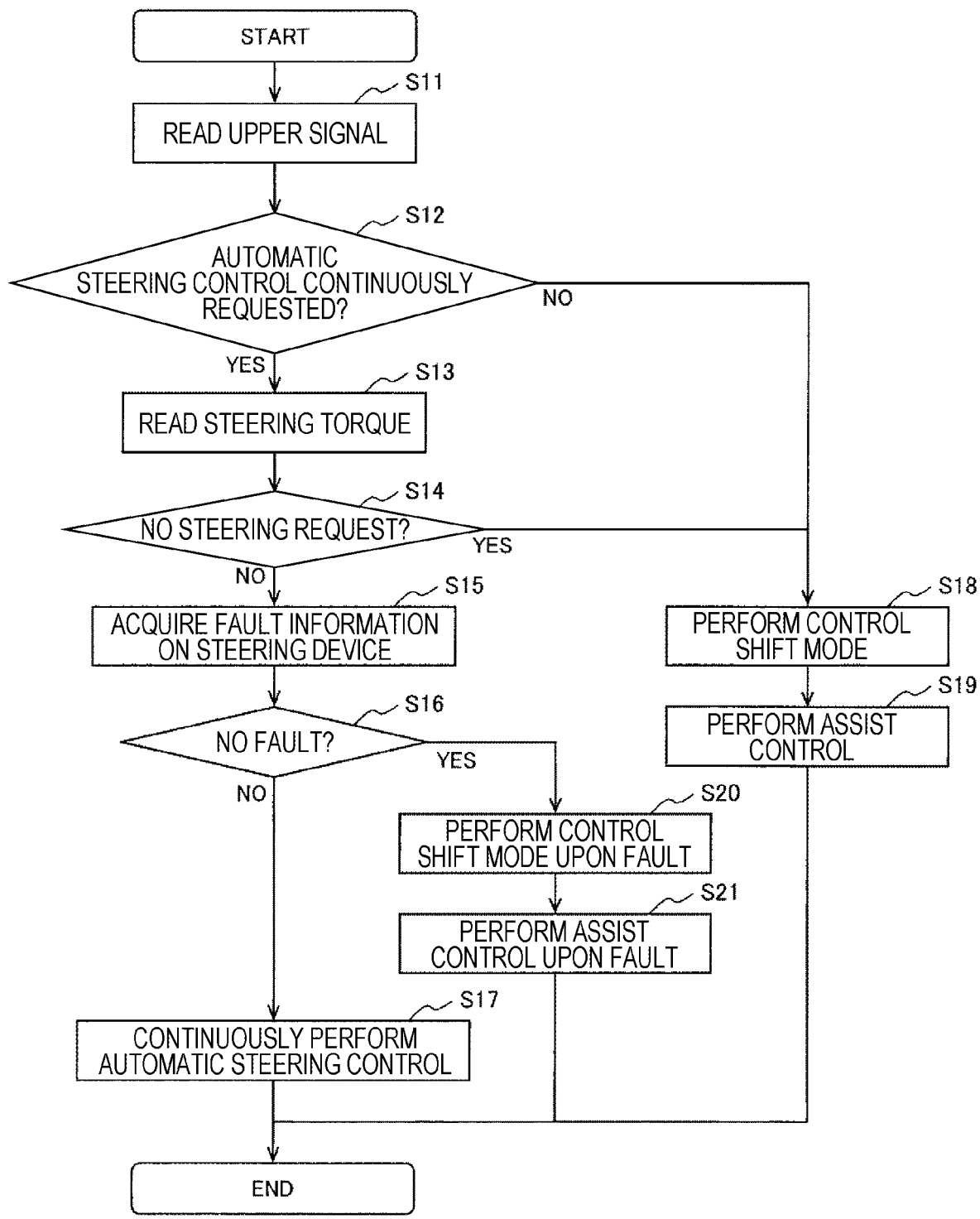
FIG. 4 is a flowchart showing an automatic steering control of the steering device according to the first embodiment of the present invention.

FIG. 4 is a flowchart schematically showing the processing executed during the automatic steering control.

The upper signal 20 is first acquired during the execution of the automatic steering control (step S11), and it is determined whether the automatic steering is continuously requested (step S12). The control method proceeds to step S13 when the automatic steering control is continuously requested, and the steering torque 21 detected by the torque sensor 12 is read. When the value of the torque sensor 12 is equal to or lower than a preset threshold value in step S14, the control method proceeds to step S15 by determining that there is no steering request by a driver without the driver holding the steering wheel 4. In step S15, the fault information of the steering device 1 is acquired. Here, the fault information includes the fault caused inside the electric drive device 2, the fault caused outside the torque sensor 12, or the like, and is extracted by an observation by a plurality of sensors, mutual monitoring of the electric motors 35 and 41 of two systems, and the like. It is determined in step S16 that there is no fault, and the control method proceeds to step S17 when there is no fault to continue to execute the automatic steering control.

In addition, when it is determined in step S12 that there is no automatic steering continuation request from the host controller 15, or the steering torque 21 is greater than the preset threshold value in the determination of step S14 and it is determined that there is the steering request by the driver, a control shift mode is executed in step S18 and a smooth shift from the automatic operation to the assist control is performed. Here, the preset threshold value of the steering torque 21 may be determined, for example, by detecting the torque which is generated by an inertial force, by the torque sensor 12, when the steering wheel 4 is operated by the electric drive device 2 during the automatic steering, and using the detected torque value and the like.

Here, the control shift mode indicates, for example, a state in which the control is performed to gradually increase the ratio of the torque output of the electric drive device 2 required for the assist control, instead of gradually reducing the torque output of the electric drive device 2 required for the automatic steering. The running behavior of the vehicle is not greatly changed by this control, so a driver does not feel discomfort from the reaction force transmitted from the steering wheel 4. If the ratio of the torque required for the automatic steering control by the control shift mode becomes zero, the shifting to the assist control S19 is performed, and then the assist control for assisting the steering torque of the driver is executed.

Next, the case in which it is determined in step S16 that a fault occurs in the steering device 1 will be described. If it is determined that a fault occurs in the steering device 1, the shifting to the control shift mode (step S20) upon the fault is performed. Here, the control shift mode upon the fault indicates a control state in which the control shifts from the automatic operation control to the assist control for assisting the steering of the driver when the steering device 1 is in a fault state.

Figure 5:
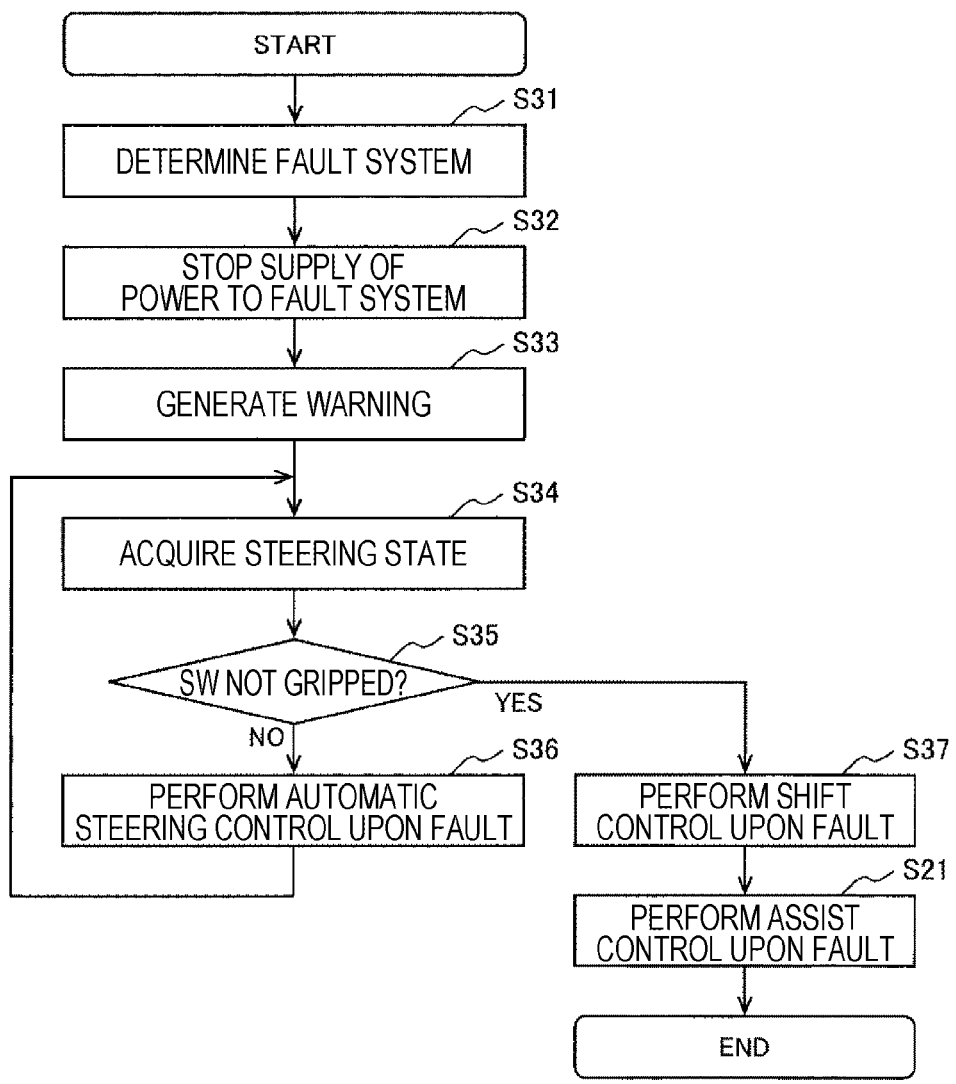
FIG. 5 is a flowchart showing a control shift mode upon a fault of the steering device according to the first embodiment of the present invention.

FIG. 5 is a flowchart showing the processing executed in step S20 of the control shift mode upon the fault.

First, the fault system is determined (step S31), and the fault system is shut off by operating the driving circuit (driving circuit A31 or driving circuit B37) of the fault system (step S32).

In addition, as shown in step S33, the warning generator 24 receives the warning instruction 25 to generate a warning to provide notification of the fault of the steering device during the occurrence of the fault. In this case, the warning generator 24 may prompt a driver to hold the steering wheel by generating the warning. In addition, the warning can be executed by, for example, a warning sound, an indicator lamp, vibrations of the steering wheel which does not damage the vehicle behavior, a reduction in a vehicle speed, the shifting to a low-speed lane by the automatic steering control, and the like, which can be used alone or in combination to be used as a warning to the driver. In addition, a warning providing notification of a fault may be issued to other vehicles which are running on a road or pedestrians. For this purpose, the warning generator 24 may be provided with a fault display 24a for displaying the fault of the steering device 1 to other vehicles by generating the warning.

Next, the information regarding the steering state of the driver is acquired (step S34). Here, in the steering state, for example, the steering torque 21 acquired by the torque sensor 12 is used. It is determined in step S35 whether the steering wheel (SW) 4 is held using this steering state. It is determined in step S35 that the steering wheel 4 is not held, for example, when the steering torque 21 does not exceed the preset threshold value. If the steering wheel 4 is not held, the processing proceeds to step S36 to execute the automatic steering control upon the fault. The automatic steering control upon the fault will be described below.

In addition, if it is determined in step S35 that the steering torque 21 is equal to or greater than the threshold value and the steering wheel 4 is held by a driver, the processing proceeds to step S37 to execute the shift control upon the fault. The shift control upon the fault will also be described below. Thereafter, the shift control upon the fault is executed in step S21.

That is, in the first embodiment, when the steering torque is equal to or greater than a predetermined value, the controller (control device) determines that the steering wheel 4 is held by a driver to switch from the automatic steering control to the assist control.

Figure 6:
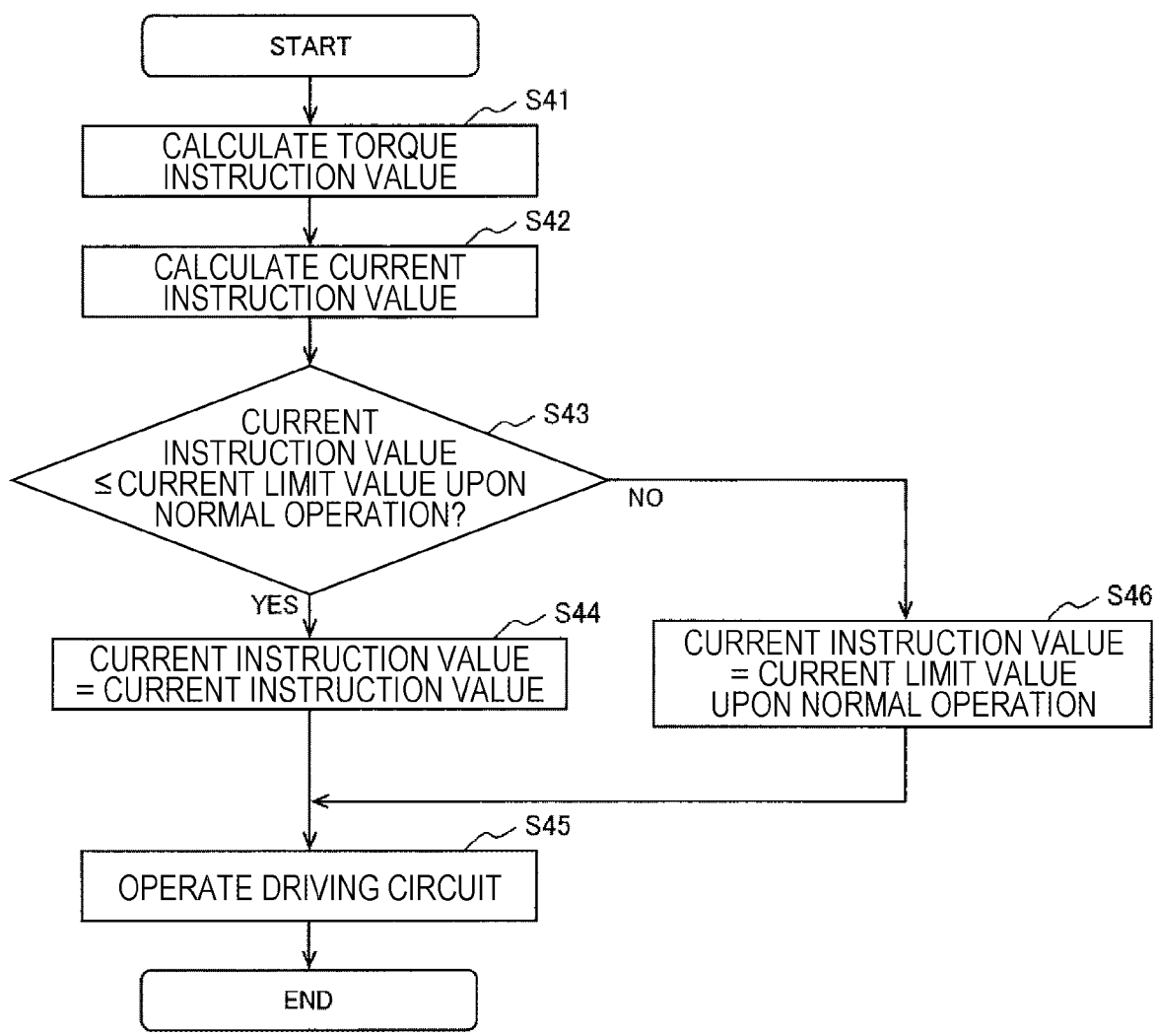
FIG. 6 is a flowchart showing an automatic steering control upon the fault of the steering device according to the first embodiment of the present invention.

FIG. 6 is a flowchart showing a processing flow of the automatic steering control upon the fault executed in step S36 of FIG. 5.

The torque instruction value after the fault of the steering device 1 is recalculated in step S41. Here, to prevent the vehicle behavior from being disturbed due to the sudden change in the torque of the steering device 1 while the vehicle is turning, the re-calculated torque instruction value is calculated to be equivalent to the torque before the fault so that [Torque instruction value=Torque instruction value for first system electric motor+Torque instruction value for second system electric motor]. In step S42, the current instruction value supplied to the normal winding A32 or winding B38 is calculated based on the calculated torque instruction value to obtain the torque output equivalent to the torque instruction value. Here, the current value supplied to each winding correlates with the torque output of each electric motor. For this reason, when the current value is large, the output of each electric motor increases.

Next, it is determined in step S43 whether the current instruction value calculated in step S42 is equal to or lower than the current limit value upon the normal operation which is supplied to each winding when the steering device 1 is operating normally. Here, the current limit value is determined beforehand, for example, from the fact that the heat generated when the current is supplied to the winding becomes the upper limit value or the like of the current which does not damage the winding or the circuit. If the current instruction value is equal to or lower than the current limit value upon the normal operation, the driving circuit A31 or the driving circuit B37 of the normal system is operated so that the current equivalent to the current instruction value is supplied to the normal winding A32 or winding B38 in step S45 without changing the current instruction value in step S44.

In addition, in the determination in step S43, if it is determined that the current instruction value calculated in step S42 is greater than the current instruction value upon the normal operation, in step S46, the current instruction value is reset to be equal to the current limit value upon the normal operation. Thereafter, the driving circuit A31 or the driving circuit B37 of the normal system is operated so that the current value equivalent to the reset current instruction value is supplied to the normal winding A32 or winding B38.

Figure 7:
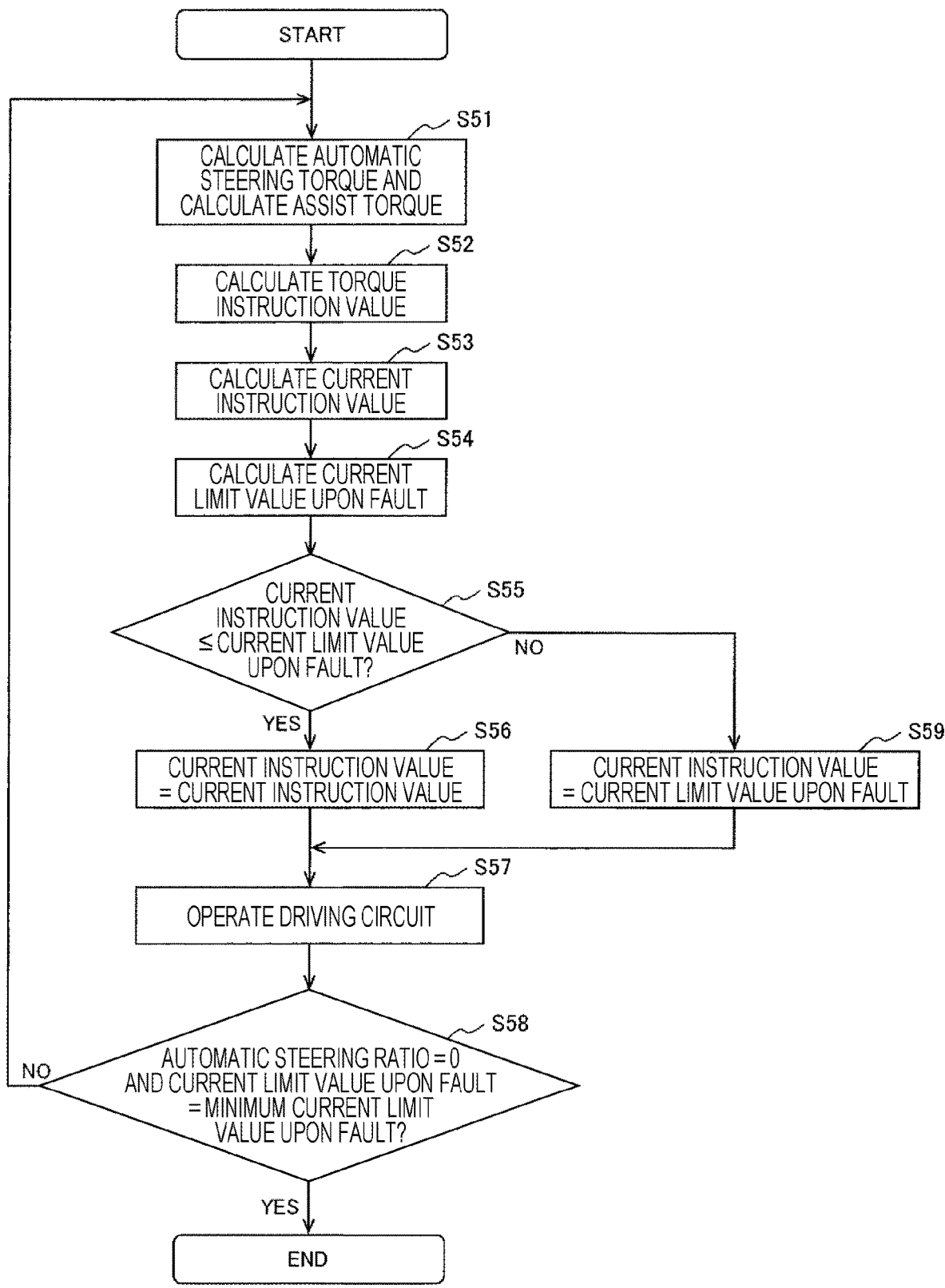
FIG. 7 is a flowchart showing a shift control upon the fault according to the first embodiment of the present invention.

FIG. 7 is a flowchart showing the processing flow of the shift control upon the fault (step S37) in FIG. 5.

In step S51, the automatic steering torque which is the torque output of the electric drive device 2 required for realizing the steering angle requested from the host controller 15 is calculated. At the same time, the assist torque 21 for assisting the driver is calculated based on the steering torque 21 detected by the torque sensor 12. Next, in step S52, the torque instruction value is calculated. Here, the torque instruction value is calculated as a value obtained by combining the previously calculated automatic steering torque with the assist torque so that the vehicle behavior does not change greatly. For example, it is preferable that as the steering torque 21 increases, the ratio of the automatic steering torque becomes small and the ratio of the assist torque becomes large. The current instruction value is calculated (step S53) based on the torque instruction value calculated in step S52. Next, the current limit value upon the fault corresponding to the maximum value of the current supplied to the winding A32 or the winding B38 which is set when a fault occurs in the electric motor of one system is calculated (step S54).

Here, it is assumed that the current limit value upon the fault is gradually reduced, and for example, is reduced with an increase in the steering torque 21 of the driver from the time when it is determined that the driver holds the steering wheel 4, and finally reaches a preset constant value. Here, the preset constant value is lower than the above-mentioned current limit value upon the normal operation, and is set under the assumption of the state in which a fault occurs in the remaining normal system and thus the assist torque cannot be generated at all. For example, it is preferable that a current value which can generate a minimum assist torque at which a driver can perform steering to prevent the vehicle behavior from being greatly disturbed against the torque shock transmitted from the steering wheel 4 at the moment the assist torque disappears is set as a minimum current limit value.

Next, in step S55, it is determined whether the current instruction value is equal to or lower than the current instruction value upon the fault set in step S54, and the current instruction value is not changed if the current instruction value is equal to or lower than the current limit value upon the fault (step S56). On the other hand, if it is determined in step S55 that the current instruction value is greater than the current limit value upon the fault, the current instruction value is set to be equal to the current limit value upon the fault (step S59). In step S57, the driving circuit A31 or the driving circuit B37 of the normal system is operated so that the current value equivalent to the current instruction value is supplied to the normal winding A32 or winding B38.

Next, it is determined in step S58 whether the ratio (automatic steering ratio) of the torque by the automatic steering is zero for the torque instruction value obtained by combining the automatic steering torque with the assist torque which is calculated in step S52. At the same time, it is determined whether the current limit value upon the fault becomes equal to the above-mentioned minimum current value upon the fault. If the automatic steering ratio is not zero or the current limit value upon the fault is not equal to the minimum current limit value upon the fault, the processing returns to step 51 and the processing is repeated. If the automatic steering ratio is zero and the current limit value upon the fault becomes equal to the minimum current limit value upon the fault, the shift control upon the fault shown in FIG. 7 ends to execute the assist control upon the fault S21.

Figure 8:
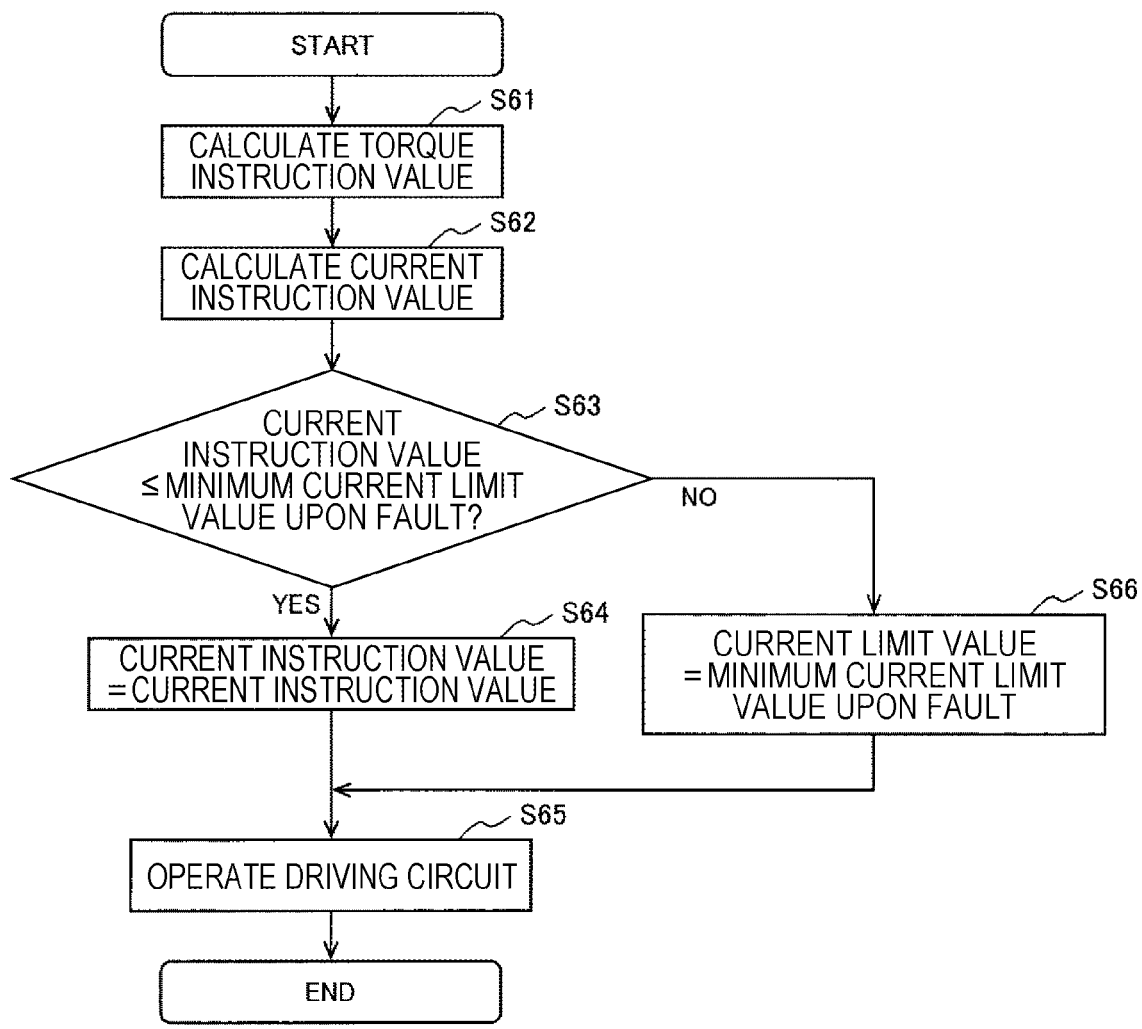
FIG. 8 is a flowchart showing an assist control upon the fault according to the first embodiment of the present invention.

FIG. 8 is a flowchart showing the processing flow of the assist control upon the fault S21.

In step S61, the torque instruction value for executing the assist control is calculated based on the steering torque 21. Here, when the electric drive device 2 is normal, the torque instruction value which is divided into the electric motors of two systems is changed to the torque instruction value which can be output by the electric motor of one system. The current instruction value supplied to the normal winding A32 or winding B38 to obtain the torque output equivalent to the torque instruction value in step S62 is calculated based on the calculated torque instruction value. Next, in step S63, it is determined whether the current instruction value becomes equal to or lower than the minimum current limit value upon the fault which is supplied to each winding. If the current instruction value is equal to or lower than the minimum current limit value upon the normal operation, the driving circuit A31 or the driving circuit B37 of the normal system is operated so that the current equivalent to the current instruction value is supplied to the normal winding A32 or winding B38 in step S65 without changing the current instruction value in step S64.

In addition, in the determination in step S63, if it is determined that the current instruction value calculated in step S62 is greater than the minimum current instruction value upon the fault, in step S66, the current instruction value is reset to be equal to the minimum current limit value upon the fault. Thereafter, the driving circuit A31 or the driving circuit B37 of the normal system is operated so that the current value equivalent to the reset current instruction value is supplied to the normal winding A32 or winding B38 (step S65).

Figure 9:
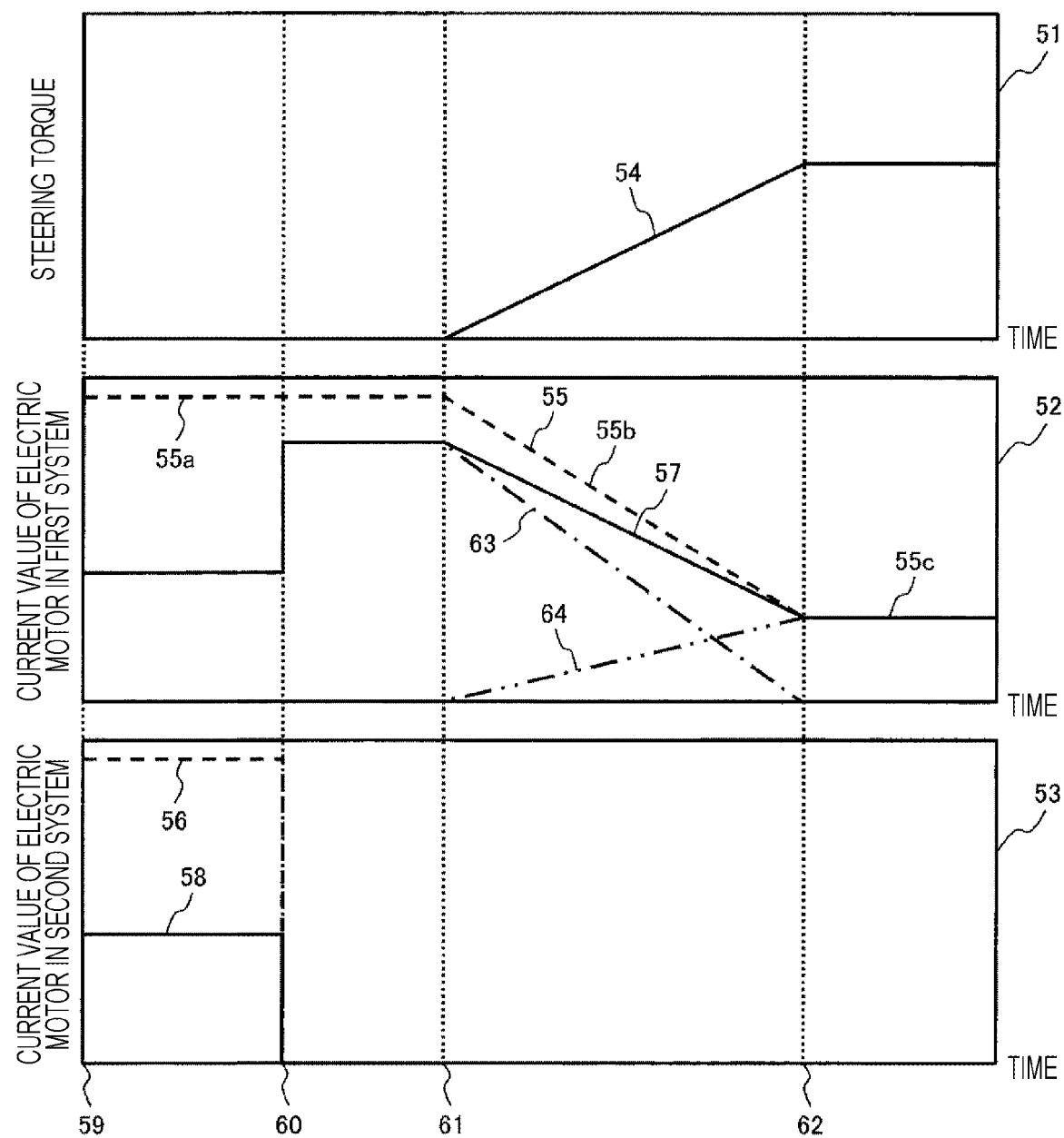
FIG. 9 is a diagram showing an example of changes in a steering torque, and a current value and a current limit value supplied to windings of electric motors of each system over time in the case in which a driver does not hold a steering wheel when a fault occurs in the steering device during an automatic operation, according to the first embodiment of the present invention.

The processing in the case in which a fault occurs in the electric motor of one system during the automatic steering control of the steering device 1 driven by the above-described configuration and processing flow will be described with reference to FIG. 9. FIG. 9 is a diagram showing the changes in the steering torque, and the current value and the current limit value which are supplied to windings of electric motors of each system over time in the case in which a driver does not hold the steering wheel 4 when a fault occurs in the steering device 1 during the automatic operation, according to the first embodiment of the present invention.

FIG. 9 shows the case in which a fault occurs in a part of the second system electric motor 41 while the vehicle equipped with the steering device 1 executing the automatic steering control runs on a curve. Of the three graphs in FIG. 9, an upper part 51 is a steering torque chart showing the change in the steering torque of the driver over time. A central part 52 is a first system electric motor current value chart showing the change in the first system motor current value over time, and shows the change in the magnitude of the current supplied to the winding A32 of the first system electric motor 35 over time. A lower part 53 is the second system electric motor current value chart showing the change in the second system motor current value over time, and shows the change in the magnitude of the current supplied to the winding B38 of the second system electric motor 41 over time. A solid line 54 in 51 shows the steering torque (steering torque 21 in FIG. 1) of the driver. In addition, a dotted line in 52 shows the current limit value of the first system electric motor 35, and a dotted line 56 in 53 shows the current limit value of the second system electric motor 41. In addition, a solid line 57 in 52 shows an example of the current instruction value of the first system electric motor 35, and a solid line 58 in 53 shows the current limit value of the second system electric motor 41.

The operation of the steering device 1 will be described using the configurations from FIGS. 1 to 9, the flowchart, and the changes in the steering torque 21 and the current value over time.

At a point of time in a period (time) 59 of the left end of FIG. 9, the vehicle is in the automatic operation state, and as shown by the solid line 54, the driver takes his/her hand off the steering wheel 4, so that the steering torque 54 as shown in the solid line 54 is not generated. In this state, as shown in step S3 of FIG. 3, the steering device 1 is operated by the combined output torque of the output torque of the first system electric motor 35 with the output torque of the second system electric motor 41 controlled by the automatic steering control.

If a fault occurs in the second system electric motor 41 at a period 60, it is determined that the second system electric motor 41 is in the fault state by acquiring the fault information of the steering device 1 in step S15 in FIG. 4 (step S16), and the control shift mode is executed in step S20. Further, it is determined in step S31 of FIG. 5 that a fault occurs in the second system electric motor 41, and the faulty second system electric motor 41 is shut off by operating the driving circuit B37 in step S32. In addition, since there is no steering torque 54 as shown in the steering torque (FIG. 9, an upper part 51) at the point time of the period 60, it is determined based on the information acquired in step S34 that the steering wheel 4 is not held (step S35) and the automatic steering control upon the fault is executed (step S36). In the automatic steering control upon the fault, the instruction value of the torque output of the electric drive device 2 is calculated in step S41 of FIG. 6. At this time, since the second system electric motor 41 is shut off due to the fault, a force for steering a wheel at the time of turning a curve is insufficient. For supplementing the insufficient force, the torque instruction value to the first system electric motor 35 which is the normal system is changed to the magnitude corresponding to the two systems before the fault as described above.

The current instruction value to the normal first system electric motor 35 is calculated based on the calculated torque instruction value (step S42). Next, in step S43, it is confirmed that the calculated current instruction value is equal to or lower than a current limit value 55*a* upon the normal operation which is the same value as the value set in the electric drive device 2 in the normal state. If the current instruction value is equal to or lower than the current limit value 55*a* upon the normal operation, the driving circuit A31 is controlled (step S45) based on the current instruction value itself (step S44). If the current instruction value exceeds the current limit value 55*a* upon the normal operation, the current instruction value is reset to be the current limit value 55*a* upon the normal operation (step S46) to control the driving circuit A31.

Here, it is assumed that the maximum output of the electric drive device 2 of the steering device 1 is designed according to the vehicle stop state in which the maximum torque is required for steering. Since the torque required for steering the wheel is small in the state in which there is a certain degree of vehicle speed, as shown in the first embodiment, in the case of the configuration of FIG. 2 in which the two systems are composed of the same electric motors 35 and 41, the torque required for the steering during running with the torque output of one system can be sufficiently generated. According to the flow shown in FIG. 6, the remaining normal first system electric motor 35 is used to continue to perform the automatic steering until the driver notices the fault of the steering device 1 and starts the steering.

Next, if a driver notices the fault of the steering device 1 at the timing of the period 61 in FIG. 9 and holds the steering wheel 4, the steering torque 54 starts to be detected as shown by the solid line 54. If the steering torque 54 increases, the shift control upon the fault is executed in step S37.

As shown in FIG. 7, the shift control upon the fault calculates the automatic steering torque required to continue to perform the automatic steering control and the assist torque required for the assist control in step S51. Next, the current value which corresponds to the torque of the torque instruction value (step S52) obtained by combining the automatic steering torque with the assist torque and is supplied to the winding A32 is calculated so that the vehicle behavior is not greatly changed and a driver does not feel the sudden change in the torque of the steering wheel 4 as described above (step S53). For example, in the change in the current value corresponding to the automatic steering torque shown by a one-dot chain line 63 and the current value corresponding to the assist torque shown by a two-dot chain line 64 over time shown in FIG. 9, the control to reduce the ratio of the automatic steering torque with increasing the steering torque 54 of the driver and to increase the ratio of the assist torque 64 is performed. In this case, the current value corresponding to the automatic steering torque is gradually reduced and the current value corresponding to the assist torque is gradually increased.

For this purpose, the controller (control device) has an automatic steering contribution ratio which is the ratio of the output (automatic steering torque) of the electric motor required for the automatic steering control as a calculation value therein and an assist control contribution ratio which is the ratio of the output (assist torque) of the electric motor required for the assist control, and slowly increases the assist control contribution ratio with slowly reducing an automatic steering contribution ratio upon switching from the automatic steering control to the assist control.

Here, in FIG. 9, the one-dot chain line 63 and the two-dot chain line 64 are described as being linearly changed with respect to the steering torque 54, but in actuality, may be nonlinearly changed depending on the steering situation.

Next, the current limit value upon the fault is calculated in step S54. The current limit value 55 of the first system electric motor 35 is also reduced with the increase in the steering torque 21 as shown by the dotted line 55*b* in FIG. 9. That is, the current limit value will be lower when the large steering torque is detected than when the small steering torque is detected. In addition, as shown in FIG. 9, for example, the current limit value upon the fault may be finally set to be a constant value 55*c* as shown by the dotted line 55. Here, when the assist torque upon the assist control is lost due to a further defect of the normal system, the final constant value 55*c* of the current limit value upon the fault may be set to be the current value corresponding to the assist torque at which the change in the vehicle behavior is limited to a predetermined value only by the steering torque 21 of the driver. For example, when all the torques of the electric drive device 2 of the steering device 1 are lost due to experimentation, simulation, and the like, the final constant value 55*c* of the current limit value upon the fault may be set to be a value or the like which prevents a vehicle from deviating from a running lane.

Next, as shown in step S55 of FIG. 7, it is confirmed that the current instruction value calculated in step S53 is equal to or lower than the current limit value upon the fault. If the current instruction value is equal to or lower than the current limit value upon the fault, the driving circuit A31 is controlled (step S57) based on the current instruction value itself (step S56). On the other hand, when the current instruction value exceeds the current limit value upon the fault, the current instruction value is reset to be the current limit value upon the fault (step S59) to control the driving circuit A31.

As shown in FIG. 9, at timing of a period 62 when the ratio of the current value depending on the automatic steering becomes zero and the current limit value also becomes equal to the minimum current limit value upon the fault, as shown in step S58 of FIG. 7, the shift control upon the fault ends and, as shown in step S21 of FIG. 5, the assist control upon the fault is executed. That is, when the steering torque is equal to or greater than a predetermined value, the controller (control device) sets the automatic steering contribution ratio to be zero to execute the control by the assist control.

As shown in FIG. 8, during the assist control upon the fault, the assist torque (torque instruction value) is calculated in step S61 and the current instruction value required for the normal first system electric motor 35 to output the assist torque is calculated (step S62). Next, it is confirmed that the current instruction value calculated in step S63 is equal to or lower than the current limit value upon the fault. If the current instruction value is equal to or lower than the current limit value upon the fault, the driving circuit A31 is controlled (step S65) based on the current instruction value itself (step S64). On the other hand, when the current instruction value exceeds the current limit value upon the fault, the current instruction value is reset to be the current limit value upon the fault (step S66) to control the driving circuit A31. The flow of FIG. 8 is repeated until the vehicle is in a stopped state, and the assist control upon the fault is continued.

In the steering device 1 including the automatic steering function, it is assumed that the driver is in the state (hand-free state) in which the driver takes his/her hand off the steering wheel 4 when the vehicle is being operated by the automatic operation. When a fault occurs in a part of the steering device 1 in the hand-free state, the steering device 1 sets the current limit value supplied to the winding A32 or the winding B38 to the same value as before the fault to continuously perform the automatic steering. For this reason, the vehicle equipped with the steering device 1 of the first embodiment can be safely and continuously run without being greatly disturbed in the behavior even when a fault occurs in the steering device 1.

Further, when a driver notices a fault and starts steering by holding the steering wheel 4, the current limit value supplied to the winding A32 or the winding B38 is set to be lower than the value before the fault of the steering device 1 to shift to the assist control. In this way, the vehicle equipped with the steering device 1 of the first embodiment can be run without deviating from a running lane even if a fault occurs in the electric motor of the remaining normal system after the shifting to the assist control.

In addition, when a driver holds the steering wheel 4, a larger steering torque is required when a fault occurs in the steering device 1 than when the steering device 1 is normal, so that a driver can easily notice a fault at the time of the assist steering and effectively promote repair.

From the above effect, the vehicle equipped with the steering device 1 of the first embodiment can be safely and continuously run even when a fault occurs in the steering device 1 during the automatic operation.

Although the electric drive device 2 in FIG. 2 has a configuration in which the control device, the driving circuit, the winding, the current detector, and the position detector are composed of two systems, a sensor such as the torque sensor 12 may have at least two and at least one sensor may be included in each system. As in this case as well, when a fault occurs in some of the control devices, the driving circuits, the windings, the current detectors, the position detectors, and the sensors of each system, it is possible to secure safety during running by the same control as the method described above.

In addition, although the electric drive device 2 having the same output shaft 19 is shown in FIG. 2, it is possible to obtain substantially the same effect even if the electric drive device 2 has the output shafts for each system.

In addition, the configuration of FIG. 2 shows an example in which the electric drive device 2 is composed of the electric motors 35 and 41 of two systems, but the same effect as the effect described above is obtained even if the same idea is applied to a configuration using electric drive devices of three or more systems.

In addition, in the example shown in FIG. 9, the steering torque is generated, and at the same time, the shifting to the assist control is performed, but the steering torque 21 is equal to or greater than the predetermined value, so that it may be determined that a driver can hold the steering wheel 4. In this way, it is possible to distinguish between the torque value due to the inertia force of the steering wheel 4 and the state actually being steered by the driver.

Figure 10:
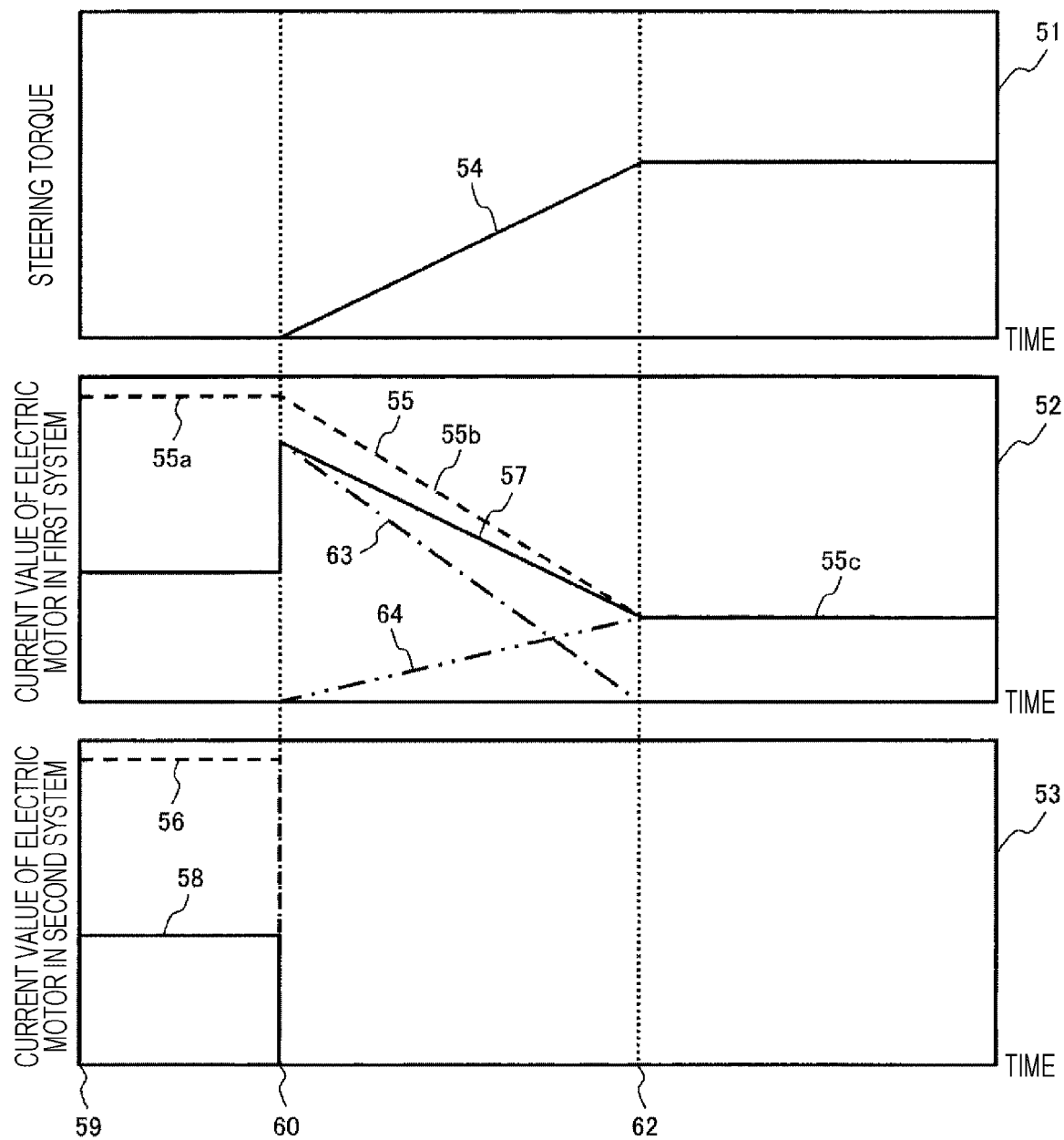
FIG. 10 is a diagram showing an example of changes in a steering torque, and a current value and a current limit value supplied to windings of electric motors of each system over time in the case in which a driver holds a steering wheel when a fault occurs in the steering device during the automatic operation, according to the first embodiment of the present invention.

In addition, when the driver is handling the steering wheel 4 even during the automatic steering operation at the time of a fault, the control is executed as shown in FIG. 10. FIG. 10 is a diagram showing the changes in the steering torque, and the current value and the current limit value supplied to windings of electric motors of each system over time in the case in which a driver holds the steering wheel 4 when a fault occurs in the steering device 1 during the automatic operation, according to the first embodiment of the present invention.

In this case, it is determined that the steering wheel 4 is held by the driver in step S34 of FIG. 5, and the shift control upon the fault (step S37) is executed without executing the automatic steering control upon the fault. In this case, the current limit value 55 is gradually reduced from the current limit value 55a upon the normal operation to the minimum current limit value 55c upon the fault as shown in 55b while shifting from the automatic steering control to the assist control like the above-described flow simultaneously with the fault (period 60).

In an example of FIG. 10, the automatic operation is not continued after the fault. That is, since the driver holds the steering wheel 4, the control over the period from period 60 to period 61 in FIG. 9 is omitted. In this example, the same control as that after the period 61 in FIG. 9 is executed from the period (time) 60. With this control, in this example, the generation amount of the assist torque becomes smaller than upon the normal operation by making the current limit value 55 lower than upon the normal operation. By doing so, when a fault also occurs in the normal system, the smooth shifting to the state of controlling the vehicle behavior can be achieved only by the operation of the driver, and a track of a vehicle is not greatly disturbed. In addition, since the assist torque upon the fault is small, a large force is required for steering, so that the driver can notice a fault and effectively promote repair.

In addition, although in FIG. 9 the current limit value upon the fault is reduced to the minimum current limit value upon the fault with increasing the steering torque 54, it may be changed even in consideration of the motion state of the vehicle. For example, the minimum current limit value upon the fault is greater when the vehicle speed is low than when the vehicle speed is high. By doing so, the same effect as described above can be obtained, and it is also possible to obtain the effect that the operation of the steering wheel 4 becomes easier at the time of a low speed. In addition, it is possible to obtain substantially the same effect as described above and further facilitate large steering and sudden steering by making the minimum current limit value upon the fault large when the steering angle is large or the steering speed (steering angle speed) is large. In addition, if an outside of a vehicle is recognized by an in-vehicle camera or the like, when there is an obstacle ahead of the vehicle and a driver intends to urgently avoid the obstacle, it is possible to facilitate the urgent avoidance with the above-described effects by temporarily making the minimum current limit value upon the fault large.

Second Embodiment

The steering device 1 according to a second embodiment of the present invention will be described with reference to FIGS. 11 to 13. The steering device 1 and the electric drive device 2 which execute the control of the second embodiment are the same as in the first embodiment, and therefore the description thereof will be omitted. In addition, the control flow before the fault and the control flow upon the fault are the same as those in FIGS. 3, 4, and 5.

In the second embodiment, the contents of the control flow of step S37 of FIG. 5 and step S21 of FIG. 4 of the first embodiment are different.

Figure 11:
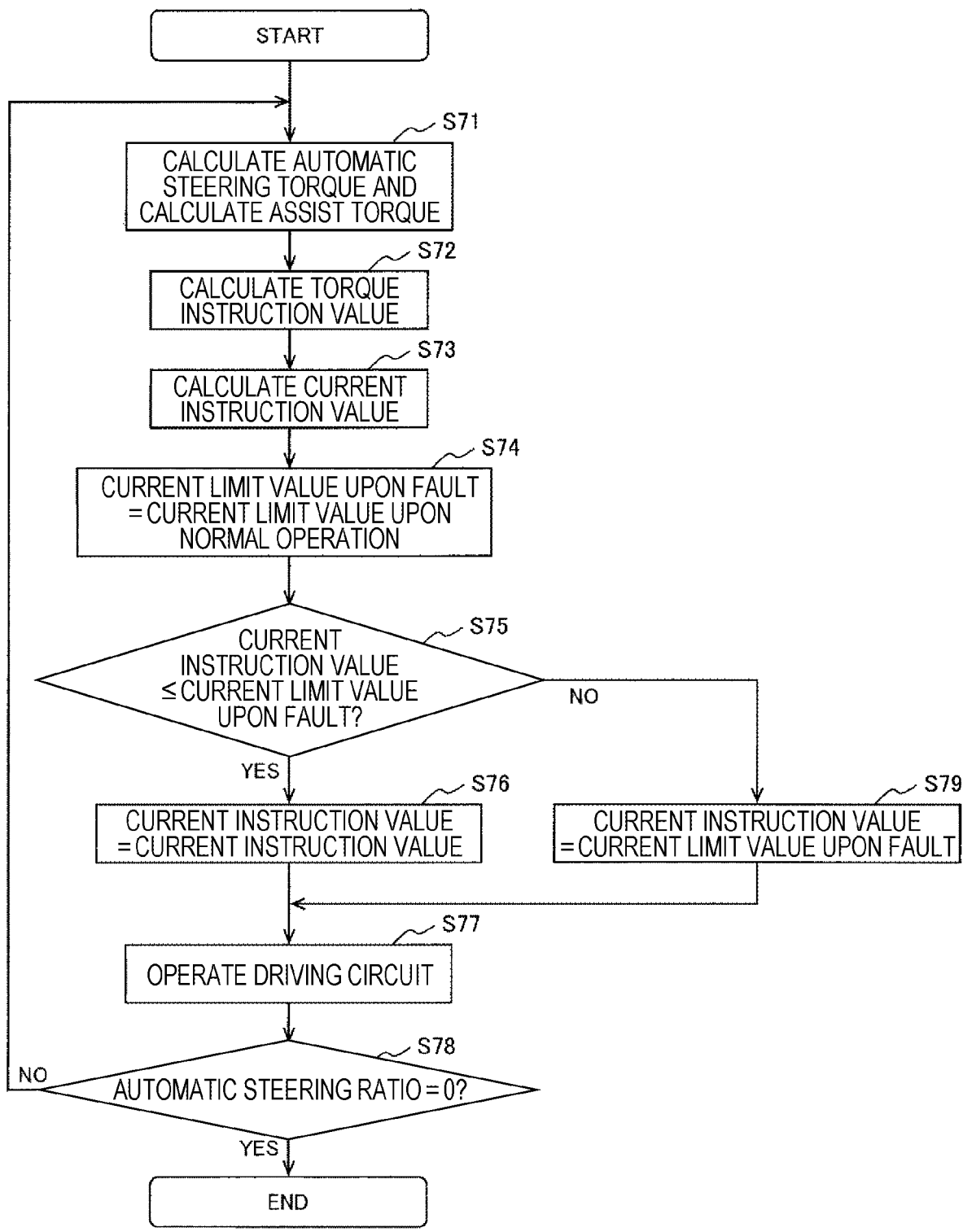
FIG. 11 is a flowchart showing a shift control upon a fault according to a second embodiment of the present invention.

FIG. 11 shows a processing flow according to the second example of the shift control upon the fault (step S37) in FIG. 5.

In step S71, the automatic steering torque which is the torque output of the electric drive device 2 required for realizing the steering angle requested from the host controller 15 is calculated. At the same time, the assist torque for assisting the torque of the driver is calculated based on the steering torque 21 detected by the torque sensor 12. Next, in step S72, the torque instruction value is calculated. Here, the torque instruction value is calculated as a value obtained by combining the automatic steering torque with the assist torque so that the vehicle behavior does not change greatly. For example, it is preferable that as the steering torque 21 increases, the ratio of the automatic steering torque becomes small and the ratio of the assist torque becomes large. The current instruction value is calculated (step S73) based on the torque instruction value calculated in step S72. Next, the current limit value upon the fault corresponding to the maximum value of the current supplied to the winding A32 or the winding B38 which is set when a fault occurs in the electric motor of one system is calculated (step S74).

Here, the current limit value upon the fault is set to be the same value as the current limit value upon the normal operation of the steering device 1 during the shift control upon the fault.

Next, in step S75, it is determined whether the current instruction value is equal to or lower than the current instruction value upon the fault set in step S74, and the current instruction value is not changed if the current instruction value is equal to or lower than the current limit value upon the fault (step S76). On the other hand, if it is determined in step S75 that the current instruction value is greater than the current limit value upon the fault, the current instruction value is set to be equal to the current limit value upon the fault (step S79). In step S77, the driving circuit A31 or the driving circuit B37 of the normal system is operated so that the current value equivalent to the current instruction value is supplied to the normal winding A32.

Next, it is determined in step S78 whether the ratio (automatic steering ratio) of the torque by the automatic steering is zero for the torque instruction value obtained by combining the automatic steering torque with the assist torque which is calculated in step S72. If the automatic steering ratio is not zero, the processing returns to the step S71 and the processing is repeated. When the automatic steering control is zero, the shift control upon the fault shown in FIG. 11 ends and the assist control upon the fault S21 is executed.

Figure 12:
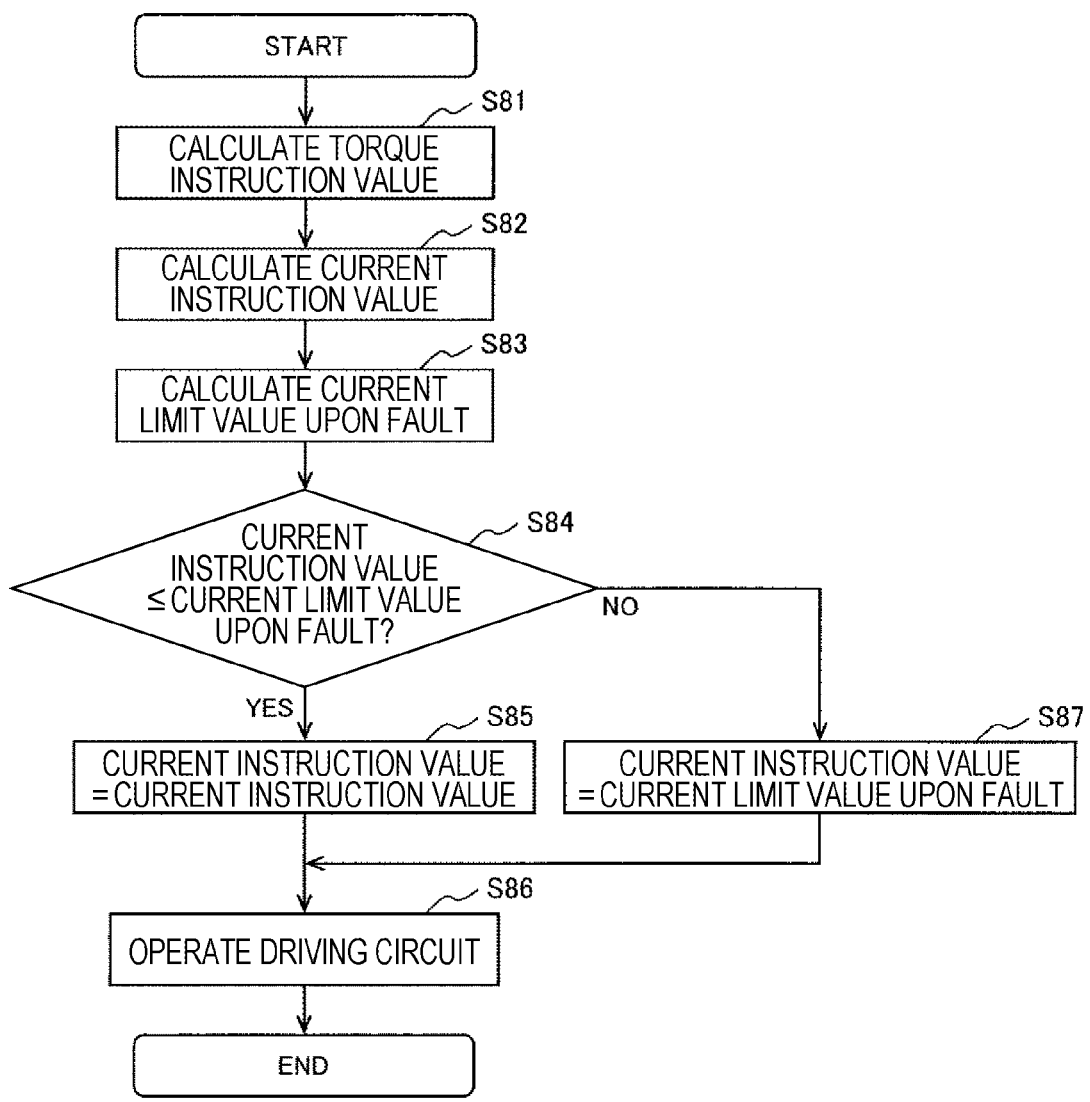
FIG. 12 is a flowchart showing an assist control upon the fault according to the second embodiment of the present invention.

FIG. 12 is a flowchart showing a processing flow according to the second embodiment of the assist control upon the fault S21.

In step S81, the torque instruction value for executing the assist control is calculated based on the steering torque 21. Here, when the electric drive device 2 is normal, the torque instruction value divided into electric motors (electric drive device) of two systems is changed to the torque instruction value which can be output by the electric motor of one system. The current instruction value supplied to the normal winding A32 or winding B38 to obtain the torque output equivalent to the torque instruction value in step S82 is calculated based on the calculated torque instruction value.

Next, the current limit value upon the fault corresponding to the maximum value of the current supplied to the normal winding A32 or winding B38 which is set when a fault occurs in the electric motor of one system is calculated (step S84). Here, it is assumed that the current limit value upon the fault is gradually reduced, and for example, is reduced with a period and finally reaches a preset constant value. Here, the preset constant value is set to be a value lower than the current limit value upon the normal operation as described above. In addition, the constant value may be set to be the value (current value, minimum current limit value upon fault) capable of generating the minimum assist torque that allows a driver to perform the steering without greatly disturbing the vehicle behavior, when a fault occurs in the remaining normal system and the assist torque cannot be generated at all and the shifting only to the steering torque of the driver is performed.

Next, it is determined in step S84 whether the current instruction value is equal to or lower than the current limit value upon the fault which is supplied to each wining. If the current instruction value is equal to or lower than the current limit value upon the fault, the driving circuit A31 or the driving circuit B37 of the normal system is operated so that the current equivalent to the current instruction value is supplied to the normal winding A32 or winding B38 in step S86 without changing the current instruction value in step S85.

In addition, in the determination in step S84, if it is determined that the current instruction value calculated in step S82 is greater than the current instruction value upon the fault, in step S87, the current instruction value is reset to be equal to the current limit value upon the fault. Thereafter, the driving circuit A31 of the normal system is operated so that the current value equivalent to the reset current instruction value is supplied to the normal winding A32 (step S86).

The above-described assist control upon the fault shown in FIG. 12 is repeatedly executed until the vehicle stops.

In the steering device 1 of which the driving is controlled by the above configuration, the processing in the case in which a fault occurs in the electric motor of one system during the automatic steering control will be described with reference to FIG. 13. FIG. 13 is a diagram showing an example of the changes in the steering torque, and the current value and the current limit value supplied to the windings of the electric motors of each system over time in the case in which a driver does not hold the steering wheel 4 when a fault occurs in the steering device 1 during the automatic operation, according to the second embodiment of the present invention.

Figure 13:
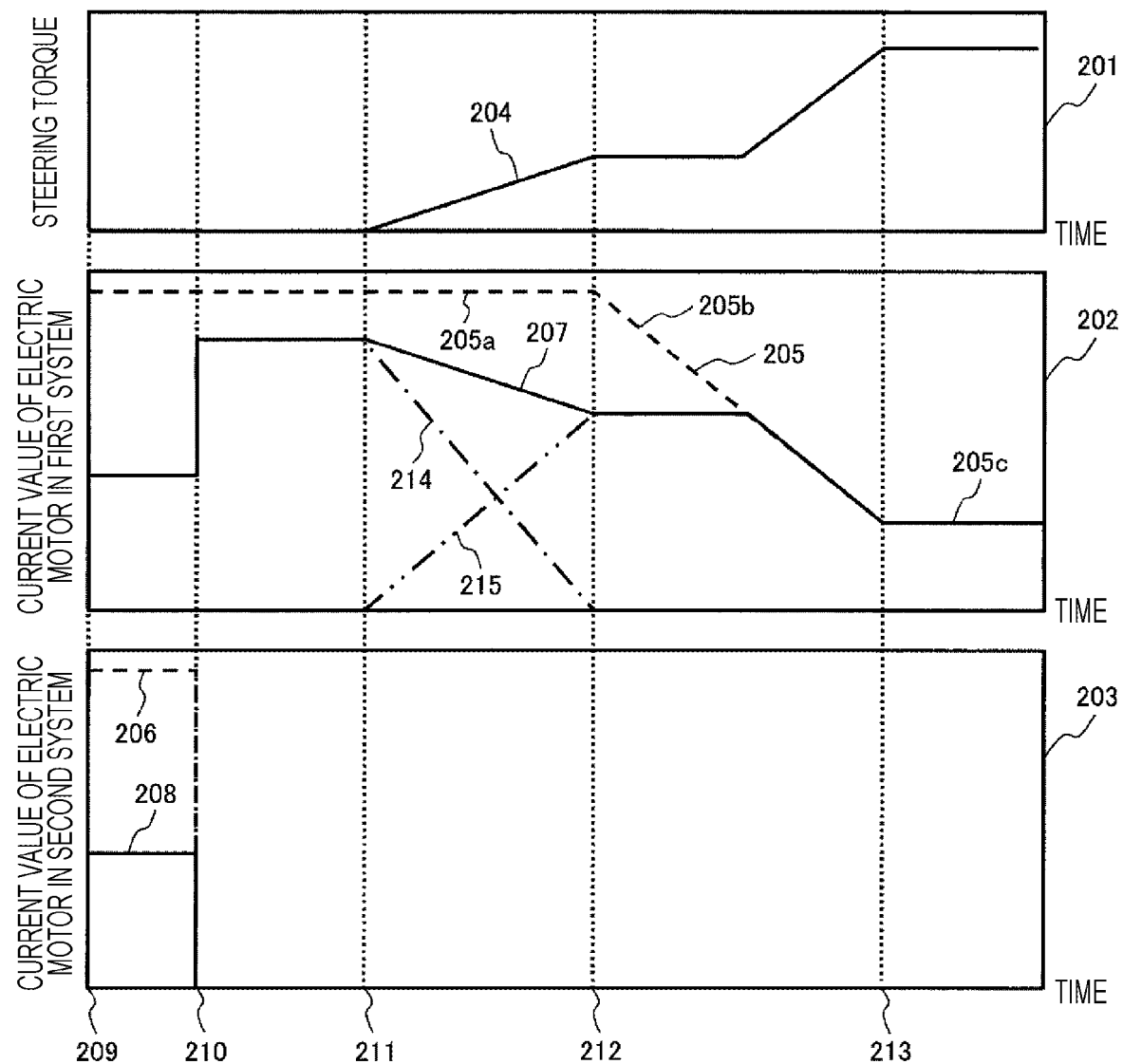
FIG. 13 is a diagram showing an example of a change in a steering torque, and a current value and a current limit value supplied to windings of electric motors of each system over time in the case in which a driver does not hold a steering wheel when a fault occurs in the steering device during an automatic operation, according to the second embodiment of the present invention.

FIG. 13 shows the case in which a fault occurs in a part of the second system electric motor 41 while the vehicle equipped with the steering device 1 executing the automatic steering control runs on a curve. Of the three graphs in FIG. 13, an upper part 201 is a steering torque chart showing the change in the steering torque 21 of the driver over time. A central part 202 is a first system electric motor current value chart showing the change in the first system electric motor current value over time, and shows the change in the current value supplied to the winding A32 of the first system electric motor 35 over time. A lower part 203 is the second system electric motor current value chart showing the change in the second system electric motor current value over time, and shows the change in the current value supplied to the winding B38 of the second system electric motor 41 over time. A solid line 204 in the upper part 201 shows the steering torque (steering torque 21 in FIG. 1) of the driver. In addition, a dotted line 205 in the central part 202 shows an example of the current limit value of the first system electric motor 35, and a dotted line 206 in the lower part 203 shows an example of the current limit value of the second system electric motor 41. In addition, a solid line 207 in the central part 202 shows an example of the current instruction value of the first system electric motor 35, and a solid line 208 in the lower part 203 shows an example of the current instruction value of the second system electric motor 41.

At a point of time in a period (time) 209 of the left end in FIG. 13, the vehicle is in the automatic operation state, and as shown by the solid line 204, the driver takes his/her hand off the steering wheel 4, so that the steering torque 204 is not generated. For this reason, as shown in step S3 of FIG. 3, the steering device 1 is operating by the automatic steering control depending on the combined output torque of the output torque of the first system electric motor 35 and the output torque of the second system electric motor 41.

If a fault occurs in the second system electric motor 41 at a period 210, it is determined that the second system electric motor 41 is in the fault state by acquiring the fault information of the steering device 1 in step S15 in FIG. 4 (step S16), and the control shift mode is executed in step S20. The fault system is determined in step S31 of FIG. 5, and the driving circuit B37 is operated in step S32 to shut off the fault second system electric motor 41. In addition, since there is no steering torque 204 as shown in the upper part 201 of the steering torque at the point of time of the period 210, it is determined based on the information acquired in step S34 that the steering wheel 4 is not held (step S35) and the automatic steering control upon the fault is executed (step S36). In the automatic steering control upon the fault, the instruction value of the torque output of the electric drive device 2 is calculated in step S41 of FIG. 6. At this time, since the second system electric motor 41 is shut off due to the fault, a torque at the time of turning a curve is insufficient. For supplementing the insufficient torque, the torque instruction value to the first system electric motor 35 which is the normal system is changed to the magnitude corresponding to the two systems before the fault as described above.

The current instruction value to the normal first system electric motor 35 is calculated based on the calculated torque instruction value (step S42). Next, in step S43, it is confirmed that the calculated current instruction value is equal to or lower than a current limit value 205a upon the normal operation which is the same value as the value set in the electric drive device 2 in the normal state. If the current instruction value is equal to or lower than the current limit value 205a upon the normal operation, the driving circuit A31 is controlled (step S45) based on the current instruction value itself (step S44). If the current instruction value exceeds the current limit value 205a upon the normal operation, the current instruction value is reset to be the current limit value 205a upon the normal operation (step S46) to control the driving circuit A31.

Here, it is assumed that the maximum output of the electric drive device 2 of the steering device 1 is designed according to the vehicle stop state in which the maximum torque is required for steering. Therefore, when the vehicle speed is at a certain level, the necessary torque is reduced, and in the case of the configuration in which the two systems have the same electric drive devices 35 and 41 as shown in the second embodiment, the torque required for the steering during the running can be sufficiently covered by the torque output of one system. According to the flow shown in FIG. 6, the normal first system electric motor 35 is used to continuously perform the automatic steering until the driver notices the fault of the steering device 1 and starts the steering.

Next, if a driver notices the fault of the steering device 1 at the timing of the period 211 in FIG. 13 and holds the steering wheel 4, the steering torque 204 starts to be detected as shown by the solid line 204. If the steering torque 204 increases, the shift control upon the fault is executed in step S37.

As shown in FIG. 11, the shift control upon the fault according to the second embodiment calculates the automatic steering torque required to continuously perform the automatic steering control and the assist torque required for the assist control in step S71. Next, as described above, the current value which is obtained by combining the automatic steering torque with the assist torque (step S72), and corresponds to each torque and is supplied to the winding A32 is calculated (step S73) so that the vehicle behavior is not greatly changed and a driver does not feel the sudden change in the torque of the steering wheel 4. For example, in the change in the current value corresponding to the automatic steering torque shown by a one-dot chain line 214 and the current value corresponding to the assist torque shown by a two-dot chain line 215 over time which is shown in FIG. 13, the control to reduce the ratio of the automatic steering torque with increasing the steering torque 204 of the driver and increase the ratio of the assist torque is performed. In this case, the current value corresponding to the automatic steering torque is gradually reduced and the current value corresponding to the assist torque is gradually increased. Here, in FIG. 13, the one-dot chain line 214 and the two-dot chain line 215 are described as being linearly changed with respect to the steering torque 204, but in actuality, may be nonlinearly changed depending on the steering situation.

Next, in step S74, the current limit value upon the fault is set, but herein, the current limit value is not changed from the current limit value upon the normal operation during the shift control upon the fault. That is, the output limit value (current limit value upon fault) of the electric motor of the normal system is the same value as the output upper limit value (current limit value upon normal operation) until the steering wheel 4 is held by the driver and is shifted to the assist control.

Next, as shown in FIG. 11, it is confirmed that the current instruction value calculated in step S73 is equal to or lower than the current limit value upon the fault (step S75). If the current instruction value is equal to or lower than the current limit value upon the fault, the driving circuit A31 is controlled (step S77) based on the current instruction value itself (step S76). On the other hand, when the current instruction value exceeds the current limit value upon the fault, the current instruction value is reset to be the current limit value upon the fault (step S79) to control the driving circuit A31.

As shown in FIG. 13, at timing of a period 212 when the ratio of the current value depending on the automatic steering becomes zero, as shown in step S78 of FIG. 11, the shift control upon the fault ends and the assist control upon the fault shown in step S21 of FIG. 5 is executed. At this time, after the steering wheel 4 is held by the driver and completely shifted to the assist control, the controller (control device) slowly reduces the output limit value of the electric motor of the normal system to the output limit value upon the fault (current limit value upon fault) with the passage of time. That is, the output limit value of the electric motor of the normal system is gradually reduced to the current limit value upon the fault.

As shown in FIG. 12, during the assist control upon the fault according to the second embodiment, the assist torque (torque instruction value) is calculated in step S81 and the current instruction value required for the normal first system electric motor 35 to output the assist torque is calculated (step S82). Next, the current limit value upon the fault is calculated in step S83. For example, as shown by the dotted line 205 (part 205b) in FIG. 13, the current limit value is reduced with time. In addition, as shown by the dotted line 205 (part 205c), the current limit value upon the fault may be finally set to be the minimum current limit value upon the fault as in the first embodiment.

Next, it is confirmed in step S84 that the calculated current instruction value is equal to or lower than the current limit value upon the fault. If the current instruction value is equal to or lower than the current limit value upon the fault, the driving circuit A31 is controlled (step S85) based on the current instruction value itself (step S86). On the other hand, when the current instruction value exceeds the current limit value upon the fault, the current instruction value is reset to be the current limit value upon the fault (step S87) to control the driving circuit A31. The flow of FIG. 12 is repeated until the vehicle is in a stopped state, and the assist control upon the fault is continued.

As in the first embodiment even by the second embodiment, it is assumed that the driver is in the state (hand-free state) in which the driver takes his/her hand off the steering wheel 4 when the vehicle is being operated by the automatic operation. When a fault occurs in a part of the steering device 1 in the hand-free state, the current limit value supplied to the winding A32 or the winding B38 is set to be the same value as before the fault, so the automatic steering is continued. By doing so, the vehicle equipped with the steering device 1 of the second embodiment can be safely and continuously run without being greatly disturbed in the behavior even when a fault occurs in the steering device 1.

Further, when a driver notices a fault and starts steering by holding the steering wheel 4, the current limit value supplied to the winding A32 or the winding B38 is set to be lower than the value before the fault of the steering device 1, so the shifting to the assist control is performed. By doing so, the vehicle equipped with the steering device of the second embodiment can be run without deviating from the running lane even if a fault occurs in the electric motor (electric driver) of the remaining normal system.

In addition, when a driver holds the steering wheel 4, a larger steering torque is required when a fault occurs in the steering device 1 than when the steering device 1 is normal, so that the driver can easily notices a fault at the time of the assist steering and promote repair.

From the above effect, even the vehicle equipped with the steering device 1 according to the second embodiment of the present invention can be safely and continuously run when a fault occurs in the steering device 1 during the automatic operation.

Third Embodiment

A steering device 1 according to a third embodiment of the present invention will be described with reference to FIGS. 14 and 15. The configurations of the steering device 1 and the electric drive device 2 of the third embodiment are the same as those of the first embodiment and the second embodiment (FIGS. 1 and 2), and therefore a description thereof will be omitted herein. In addition, the flowchart is the same as the flowchart (FIGS. 3 to 8) of the first embodiment, and therefore a description thereof will be omitted.

The third embodiment is different in the calculation of the current limit value upon the fault in step S54, among the processing of the control shift mode upon the fault of FIG. 7 in the first embodiment.

Figure 14:
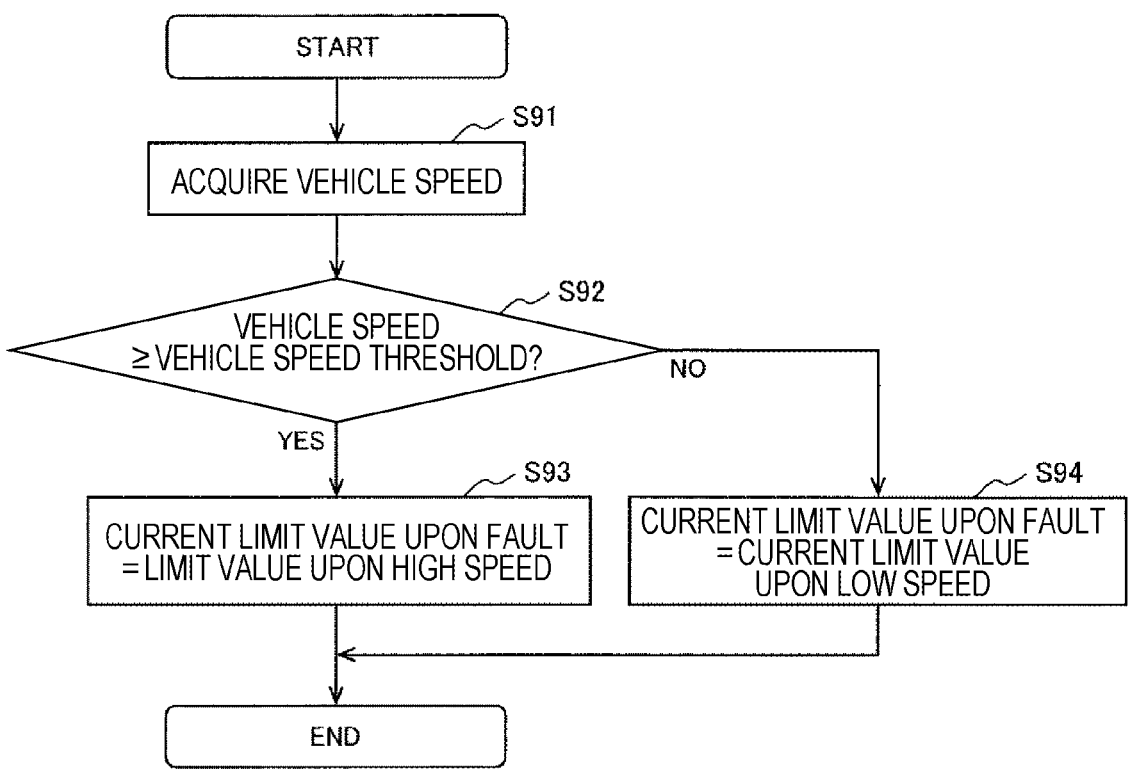
FIG. 14 is a flowchart showing a process for setting a current limit value upon a fault according to a third embodiment of the present invention.

FIG. 14 is a flowchart showing processing related to the setting of the current limit value upon the fault according to the third embodiment of the present invention.

In the third embodiment, the processing shown in the flowchart of FIG. 14 is executed during the calculation of the current limit value upon the fault (step S54) of FIG. 7. In step S91, the vehicle speed which is one of the vehicle state 22 signals is acquired. After acquiring the vehicle speed, in step S92, it is determined whether the vehicle speed is equal to or greater than a preset vehicle speed threshold value. Here, the vehicle speed threshold value is determined on the basis of, for example, the change in the vehicle speed of the force required for steering the wheel, for example, a vehicle speed at which a force in a certain level or more is required may be set as the threshold value.

If it is determined in step S92 that the vehicle speed is equal to or greater than the vehicle speed threshold value, the current limit value upon the fault is set to be the limit value upon high speed (step S93). In addition, if it is determined in step S92 that the vehicle speed is lower than the vehicle speed threshold value, the current limit value upon the fault is set to be a limit value upon low speed (step S94).

Here, the limit value upon the high speed and the limit value upon the low speed change according to an increase in the steering torque and elapse of time, and finally are a current limit value supplied to the winding A32 and the winding B38, which becomes a preset constant value. The preset constant value of the current limit value may be set so that the limit value upon the high speed is lower than the limit value upon the low speed. In addition, these limit values may be set to be a value which prevents a vehicle from deviating from a lane due to the disturbance of behavior when the torque of the remaining system output by the current limit value in each speed region is lost due to the further fault of the remaining system.

In the steering device 1 of which the driving is controlled by the configuration of the case in which the processing is added, the processing in the case in which a fault occurs in the electric motor of one system during the automatic steering control will be described with reference to FIG. 15. FIG. 15 is a diagram showing the changes in the steering torque, and the current value and the current limit value supplied to windings of electric motors of each system over time in the case in which a driver does not hold the steering wheel 4 when a fault occurs in the steering device 1 during the automatic operation, according to the third embodiment of the present invention.

Figure 15:
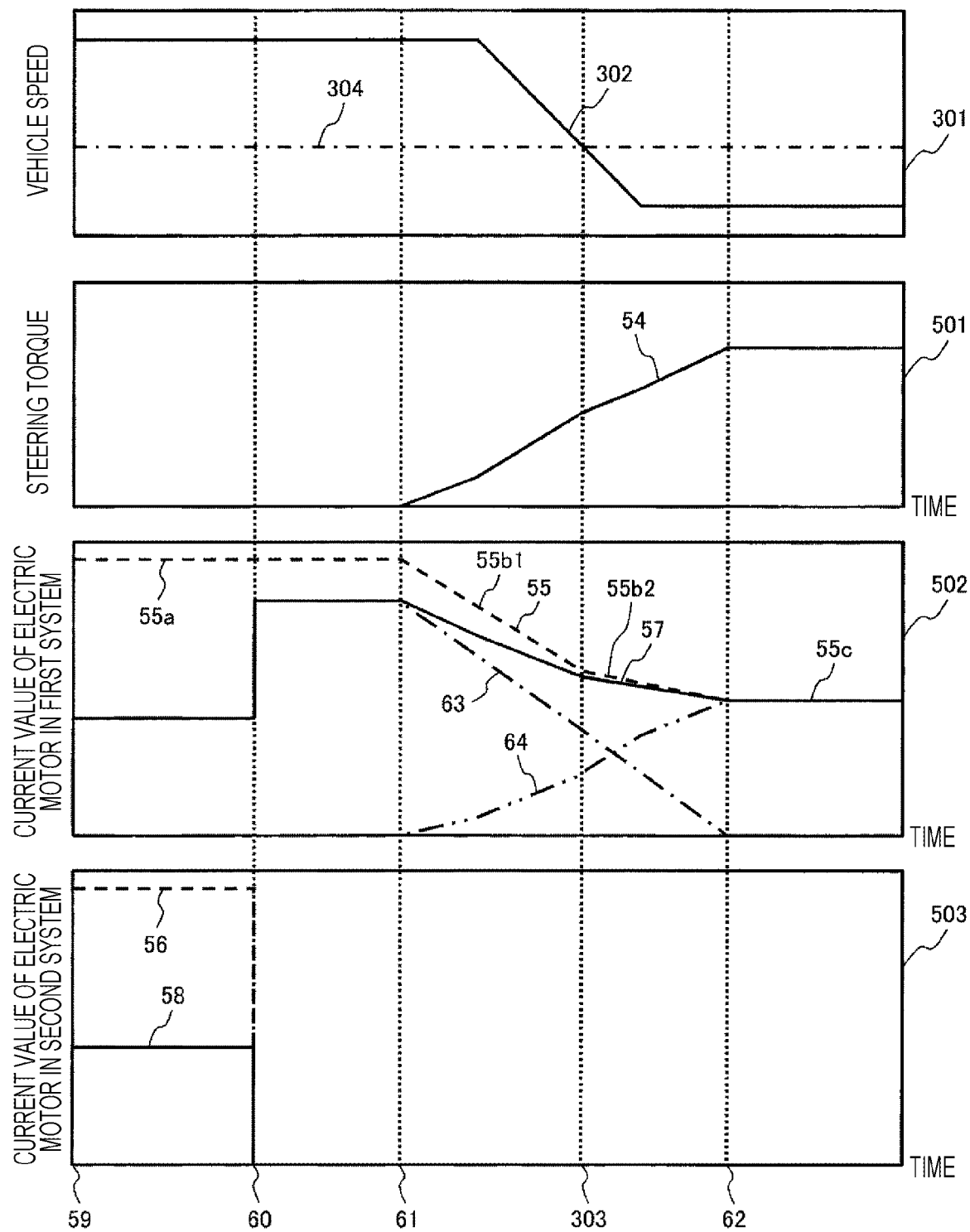
FIG. 15 is a diagram showing an example of a change in a steering torque, and a current value and a current limit value supplied to windings of electric motors of each system over time in the case in which a driver does not hold a steering wheel when a fault occurs in the steering device during an automatic operation, according to the third embodiment of the present invention.

FIG. 15 assumes a case in which a fault occurs in a part of the second system electric motor 41 while the vehicle equipped with the steering device 1 executing the automatic steering control is running on a curve.

Reference numeral 501 of FIG. 15 is the same steering torque chart as the steering torque showing the change in the steering torque over time of FIG. 9 of the first embodiment. Reference numeral 502 is the same first system electric motor current value chart as the first system electric motor current value chart 52 of FIG. 9 showing the magnitude of the current value supplied to the winding A32 of the first system electric motor. Reference numeral 503 is the same second system electric motor current value chart as the second system electric motor current value chart 53 of FIG. 9 showing the magnitude of the current value supplied to the winding B38 of the second system electric motor. In addition to FIG. 9, in FIG. 15, a vehicle speed diagram 301 showing a vehicle speed is added. A solid line 302 of the vehicle speed diagram 301 shows a change in a vehicle speed over time. In addition, the processing of the third embodiment is the same as the processing of the first embodiment until a driver holds the steering wheel 4 at a period 61 of FIG. 15, and therefore a description thereof will be omitted.

If the driver holds the steering wheel 4 at the period (time) 61 and the steering torque 54 is increased, the shift control upon the fault is executed in step 37 of FIG. 5. As shown in 301 showing the vehicle speed of FIG. 15, it is assumed that the vehicle speed 302 is reduced during the execution of the shift control upon the fault. In this case, the vehicle speed is below the vehicle speed threshold value 304 in which the vehicle speed is preset at a period 303. When the vehicle speed is above the vehicle speed threshold value 304, a current limit value 55$b1$ is gradually reduced with the increase in the steering torque 54 in the same manner as the first embodiment. On the other hand, when the vehicle speed is below the vehicle speed threshold value 304 at period 5303, a reduction amount of a current limit value 55$b2$ is reduced.

In addition, although the current limit value 55 reaches the minimum current limit value 55$c$ upon the fault at the period 62, the value is also set to be a greater value as compared with the case in which the vehicle speed is equal to or greater than the vehicle speed threshold value. Accordingly, the current instruction value of the normal first system electric motor 35 shown by a solid line 57 can be greater as compared with the case of the high speed, and the current value corresponding to the assist torque shown by the two-dot chain line 64 may be greater. Therefore, it is possible to suppress the change in the steering torque 54.

With the above configuration, similarly to the first embodiment, the steering device 1 to be controlled can stably and continuously run a vehicle even if a fault occurs in the electric motor of one system configuring the electric drive device 2 during the automatic operation. In addition, when the vehicle speed is reduced and the force required to steer the wheel becomes large, it is possible to increase the output of the electric drive device 2 and reduce the load of the driver by increasing the current limit value according to the vehicle speed.

Although the configuration in which the current limit value is switched depending on the threshold value of the vehicle speed is described in the above example, the current limit value may be continuously increased as the vehicle speed is reduced. Even in this case, similarly, the same effect of reducing the load of the driver can be obtained.

In addition, although the case in which the current limit value is changed in accordance with the vehicle speed is described in the above example, the configuration in which the current limit value may be changed according to the change in the steering angle or the change in the steering angular velocity, instead of the change in the steering angle may be allowed.

Further, when there is a request such as the collision avoidance with the information of the host controller 15 and the vehicle state 22, the processing such as temporarily increasing the current limit value may be performed. That is, the output limit value upon the fault may be set to be a greater value when there is the collision avoidance request than when there is no collision avoidance request.

It should be noted that the present invention is not limited to each of the above-mentioned embodiments, but includes various modifications. For example, the above-described embodiments have been described in detail in order to explain the present invention in an easy-to-understand manner, and the present invention is not necessarily limited to the embodiments including all the components. In addition, it is possible to substitute some of components of any embodiment into components of other embodiments and it is possible to add components of other embodiments to components of any embodiment. In addition, it is possible to add, delete, or replace other components with respect to some of components of each embodiment.

REFERENCE SIGNS LIST

1 steering device
2 electric drive device
3 steering mechanism
4 steering wheel
5 steering shaft
6 pinion shaft
7 rack shaft
8 deceleration mechanism
9 tie rod
10, 11 wheel
12 torque sensor
13 belt pulley
14 ball screw
15 host controller
16 input terminal
17 output terminal
18 power supply
19 output shaft
20 upper signal
21 steering torque signal
22 vehicle state signal
23 steering device state signal
24 warning device
25 warning instruction
30 control device A
31 current detector A
32 winding A
33 position detector A
35 first system electric motor
36 control device B
37 current detector B
38 winding B
39 current detector B
40 position detector B
41 second system electric motor

The invention claimed is:

1. A steering device, comprising:
an electric drive device which includes a plurality of systems comprising a first system that includes a first electric motor and a second system that includes a second electric motor, the first electric motor comprising a first driving circuit and a first winding, the second electric motor comprising a second driving circuit and a second winding; and
a controller configured to select any of an assist control for assisting a steering force based on a steering torque input by an operation of a steering wheel, and an automatic steering control for controlling a steering angle of the steering wheel based on a steering instruction value, and to control an output of the electric drive device to be in a range not exceeding a preset output limit value, wherein the controller is configured such that when a fault occurs in the first system that includes the first electric motor during the control by the automatic steering control, the controller continues to perform the automatic steering control using the second electric motor of the second system, and when the controller then shifts to the assist control, the controller sets the output limit value of the second electric motor of the second system to a value lower than an output limit value used during normal operation when the first electric motor and the second electric motor are normally operated, wherein the controller is configured to retrieve an automatic steering contribution ratio which is a ratio of an output of the second electric motor required for the automatic steering control as a calculation value therein and an assist control contribution ratio which is the ratio of the output of the second electric motor required for the assist control, and the controller is configured to increase the assist control contribution ratio with reducing the automatic steering contribution ratio upon switching from the automatic steering control to the assist control, wherein the controller includes a warning generator configured to issue a warning providing notification of a fault when the fault occurs in one of the first electric motor and the second electric motor when executing the automatic steering control, and wherein the controller is configured to perform the automatic steering control to guide a vehicle to a low-speed lane when a fault occurs in one or more of the first electric motor and the second electric motor during the control of the automatic steering control.

2. The steering device according to claim 1, wherein the output limit value upon the fault varies according to a motion state of the vehicle.

3. The steering device according to claim 2, wherein the output limit value upon the fault is set to be a greater value when a vehicle speed is low than when the vehicle speed is high.

4. The steering device according to claim 2, wherein the output limit value upon the fault is set to be a greater value when a steering angular speed is large than when the steering angular speed is low.

5. The steering device according to claim 2, wherein the output limit value upon the fault is set to be a greater value when a steering angle is large than when the steering angle is low.

6. The steering device according to claim 2, wherein the output limit value upon the fault is set to be a greater value when there is a collision avoidance request than when there is no collision avoidance request.

7. The steering device according to claim 1, wherein the controller is configured to determine that the steering wheel is held by a driver and to responsively switch from the automatic steering control to the assist control.

8. The steering device according to claim 7, wherein the controller is configured to determine that the driver holds the steering wheel when a steering torque is equal to or greater than a predetermined value.

9. The steering device according to claim 8, wherein the controller is configured to set the output limit value upon the fault to be lower when the steering torque is detected to be large than when the steering torque is detected to be small.

10. The steering device according to claim 1, wherein the controller is configured to continue to perform the automatic steering control when it is determined that the steering wheel is not held when a fault occurs in the first electric motor.

11. The steering device according to claim 1, wherein the controller is configured to set the automatic steering contribution ratio to be zero when the steering torque is equal to or greater than a predetermine value to execute the control by the assist control.

12. The steering device according to claim 1, wherein the controller is configured to set the output limit value of the second electric motor of the second system to be equal to the output limit value upon the normal operation until a driver holds the steering wheel to perform shifting to the assist control, when a fault occurs in the first electric motor during the control of the automatic steering control.

13. The steering device according to claim 12, wherein the controller is configured to reduce the output limit value of the second electric motor of the second system to the output limit value upon the fault after a driver holds the steering wheel and complete shifting to the assist control is performed.

14. The steering device according to claim 13, wherein the controller is configured to reduce the output limit value of the second electric motor of the second system with a lapse of time up to the output limit value upon the fault after the shifting to the assist control is performed.

15. The steering device according to claim 1, wherein the warning generator is configured to prompt a driver to hold the steering wheel by generating a warning.

16. A vehicle including the steering device according to claim 1, comprising:
a fault display configured to display a fault of the steering device to other vehicles by the warning of the warning generator.

17. A vehicle including the steering device according to claim 1, wherein the controller is configured to reduce a vehicle speed when a fault occurs in one or more of the first electric motor and the second electric motor during the control of the automatic steering control.

* * * * *